US012436396B2

(12) United States Patent
Takagi

(10) Patent No.: US 12,436,396 B2
(45) Date of Patent: Oct. 7, 2025

(54) VIRTUAL IMAGE DISPLAY DEVICE AND OPTICAL UNIT CAPABLE OF ADJUSTING DISPLAY POSITION OF VIRTUAL IMAGE

(71) Applicant: SEIKO EPSON CORPORATION, Tokyo (JP)

(72) Inventor: Masayuki Takagi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 613 days.

(21) Appl. No.: 17/537,383

(22) Filed: Nov. 29, 2021

(65) Prior Publication Data

US 2022/0171201 A1 Jun. 2, 2022

(30) Foreign Application Priority Data

Nov. 30, 2020 (JP) ................................ 2020-197885

(51) Int. Cl.
*G02B 27/01* (2006.01)

(52) U.S. Cl.
CPC ..... *G02B 27/0176* (2013.01); *G02B 27/0172* (2013.01); *G02B 2027/011* (2013.01); *G02B 2027/0132* (2013.01); *G02B 2027/0163* (2013.01); *G02B 2027/0178* (2013.01)

(58) Field of Classification Search
CPC .............. G02B 27/017; G02B 27/0176; G02B 27/0172; G02B 2027/011; G02B 2027/0132; G02B 2027/0163; G02B 2027/0178
See application file for complete search history.

(56) References Cited

U.S. PATENT DOCUMENTS

| | | | |
|---|---|---|---|
| 6,243,207 B1 | 6/2001 | Kawamura et al. | |
| 6,259,565 B1 | 7/2001 | Kawamura et al. | |
| 9,618,753 B2 * | 4/2017 | Tsuruyama | G02B 27/0172 |
| 9,628,766 B2 * | 4/2017 | Tamayama | H04N 5/64 |
| 9,658,460 B2 * | 5/2017 | Lee | G02B 27/0176 |
| 9,762,870 B2 * | 9/2017 | Yamaguchi | G09G 3/003 |
| 9,791,702 B2 * | 10/2017 | Sawada | G02B 13/18 |
| 9,958,936 B2 * | 5/2018 | Sawada | G06F 3/011 |
| 10,038,881 B2 * | 7/2018 | Tamayama | G02B 27/017 |
| 10,356,375 B2 * | 7/2019 | Tamayama | G09G 5/005 |
| 10,520,738 B2 * | 12/2019 | Choi | G02B 6/0033 |
| 10,819,898 B1 * | 10/2020 | Han | G02B 27/017 |
| 10,852,550 B2 * | 12/2020 | Lee | G02B 27/0006 |
| 10,852,557 B2 * | 12/2020 | Yan | G02B 27/0176 |
| 10,878,630 B2 * | 12/2020 | Sung | G06T 15/20 |
| 10,904,516 B2 * | 1/2021 | Selan | H04N 13/371 |

(Continued)

FOREIGN PATENT DOCUMENTS

| | | |
|---|---|---|
| JP | 2000010504 | 1/2000 |
| JP | 2005115399 | 4/2005 |

(Continued)

*Primary Examiner* — Bao-Luan Q Le
(74) *Attorney, Agent, or Firm* — JCIPRNET

(57) ABSTRACT

A virtual image display device includes a first display device for a right eye, a second display device for a left eye, a lens barrel or the like serving as an assembly member configured to assemble the first display device and the second display device, and first and second correction units serving as post-assembly adjustment devices configured to adjust a display state of the first display device and the second display device assembled by the assembly member.

16 Claims, 16 Drawing Sheets

(56) References Cited

U.S. PATENT DOCUMENTS

| | | | |
|---|---|---|---|
| 10,955,667 B2* | 3/2021 | Chang | G02B 27/0176 |
| 10,969,591 B2* | 4/2021 | Nakamura | H04N 21/816 |
| 11,030,926 B2* | 6/2021 | Shin | G02B 27/0172 |
| 11,137,614 B2* | 10/2021 | Yan | G02B 30/00 |
| 11,509,877 B2* | 11/2022 | Kim | G02B 27/0172 |
| 2002/0036597 A1 | 3/2002 | Chigira et al. | |
| 2004/0150888 A1* | 8/2004 | Domjan | G02B 27/0172 359/630 |
| 2012/0200934 A1* | 8/2012 | Fujishiro | G02B 27/0172 359/630 |
| 2013/0278497 A1* | 10/2013 | Takagi | G02B 27/017 345/156 |
| 2014/0327602 A1* | 11/2014 | Hiraide | G02B 27/0172 345/8 |
| 2015/0009416 A1* | 1/2015 | Tamayama | G09G 5/005 348/746 |
| 2015/0177520 A1* | 6/2015 | Hiraide | G02B 27/0176 359/507 |
| 2015/0185481 A1* | 7/2015 | Hiraide | G02B 6/0053 359/630 |
| 2015/0331243 A1* | 11/2015 | Sawada | G02B 27/0172 359/630 |
| 2015/0331482 A1* | 11/2015 | Sawada | G06F 3/011 345/156 |
| 2015/0338656 A1* | 11/2015 | Tsuruyama | G02B 27/0172 359/630 |
| 2015/0338662 A1* | 11/2015 | Tsuruyama | G03B 21/145 348/744 |
| 2015/0346495 A1* | 12/2015 | Welch | G02B 27/017 345/8 |
| 2016/0139412 A1* | 5/2016 | Sawada | G02B 27/0172 359/630 |
| 2016/0255317 A1* | 9/2016 | Tamayama | H04N 5/145 348/746 |
| 2016/0282623 A1* | 9/2016 | Miyao | G02B 5/26 |
| 2016/0320616 A1* | 11/2016 | Ichii | G02B 27/0179 |
| 2017/0059870 A1* | 3/2017 | Choi | G02B 27/0172 |
| 2017/0102549 A1* | 4/2017 | Lee | G02B 27/0176 |
| 2017/0178288 A1* | 6/2017 | Adaszewski | G06T 19/006 |
| 2017/0235129 A1* | 8/2017 | Kamakura | G02B 27/0006 345/8 |
| 2018/0017786 A1* | 1/2018 | Kamakura | G02B 27/0172 |
| 2018/0052327 A1* | 2/2018 | Kamakura | G02B 27/0103 |
| 2018/0067318 A1* | 3/2018 | St. Hilaire | G03H 1/0248 |
| 2018/0095284 A1* | 4/2018 | Welch | G02B 27/0081 |
| 2018/0114298 A1 | 4/2018 | Malaika et al. | |
| 2018/0197503 A1* | 7/2018 | Sasaki | G09G 3/002 |
| 2018/0213197 A1* | 7/2018 | Tamayama | G02B 27/017 |
| 2019/0333480 A1* | 10/2019 | Lang | G06F 3/011 |
| 2019/0339529 A1 | 11/2019 | Malaika et al. | |
| 2020/0035027 A1* | 1/2020 | Sung | H04N 13/344 |
| 2020/0209625 A1* | 7/2020 | Takeda | G02B 27/017 |
| 2020/0310139 A1* | 10/2020 | Takagi | G02B 6/003 |
| 2021/0063756 A1* | 3/2021 | Yonekubo | G02B 27/0172 |
| 2021/0218946 A1* | 7/2021 | Kim | H04N 13/128 |
| 2022/0035171 A1* | 2/2022 | Yamamoto | G02B 27/0093 |
| 2022/0121032 A1* | 4/2022 | Serizawa | G03B 11/046 |

FOREIGN PATENT DOCUMENTS

| | | |
|---|---|---|
| JP | 2010232718 | 10/2010 |
| JP | 2020513580 | 5/2020 |
| JP | 2020160115 | 10/2020 |

* cited by examiner

VIRTUAL IMAGE DISPLAY DEVICE AND OPTICAL UNIT CAPABLE OF ADJUSTING DISPLAY POSITION OF VIRTUAL IMAGE The present application is based on, and claims priority from JP Application Serial Number 2020-197885, filed Nov. 30, 2020, the disclosure of which is hereby incorporated by reference herein in its entirety.

BACKGROUND

1. Technical Field

The present disclosure relates to a virtual image display device such as a head-mounted display that enables formation and observation of a virtual image.

2. Related Art

A binocular virtual image display device is known that enables formation and observation of a virtual image as in a head-mounted display. In the virtual image display device, optical axes of left and right optical systems, for example, are adjusted to align left and right image positions and, for example, the virtual image display device is provided with an elastic sealing member and is configured to prevent foreign material from infiltrating during work such as adjusting the positions of the optical systems (see JP-A-2020-160115).

However, even when an optical system is assembly with a high degree of accuracy using a technique such as in JP-A-2020-160115, for example, a new shift in the optical axis of the optical system or the like may occur while the virtual image display device goes through circuit board attachment, outer packaging assembly, or the like after assembly of the optical system. In particular, a shift in the image position between the left and right sides, even when minor, may impose a significant burden on a user (wearer).

SUMMARY

A virtual image display device according to an aspect of the present disclosure is provided with a first display device that includes a first display element, a second display device that includes a second display element, a first assembly member that assembles the first display device, a second assembly member that assembles the second display device, and a post-assembly adjustment device that adjusts a position of a display area in each of the first display element and the second display element.

DESCRIPTION OF EXEMPLARY EMBODIMENTS

First Embodiment

Figure 1:
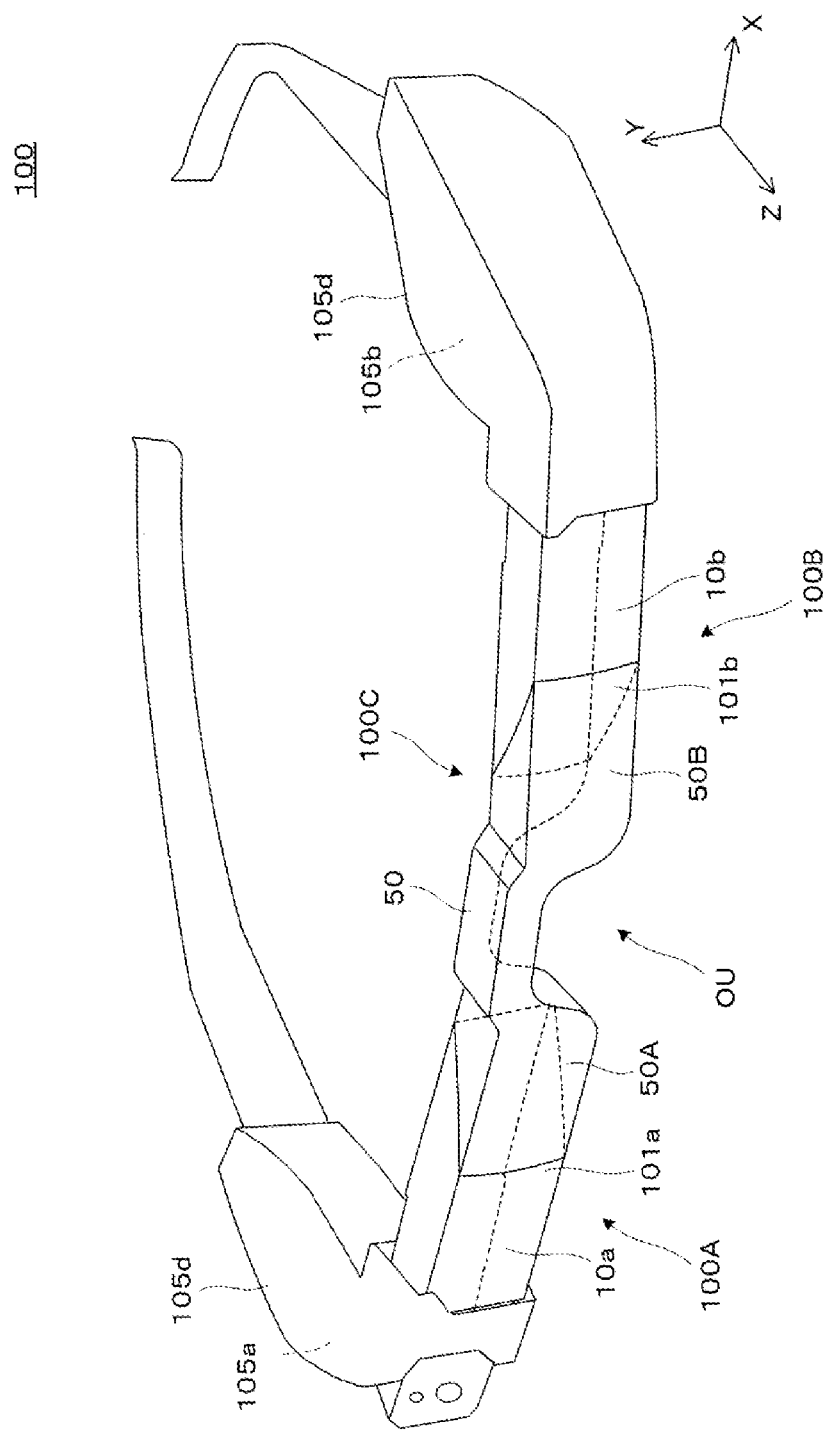
FIG. 1 is an external perspective view illustrating a schematic of a virtual image display device according to a first exemplary embodiment.
Figure 2:
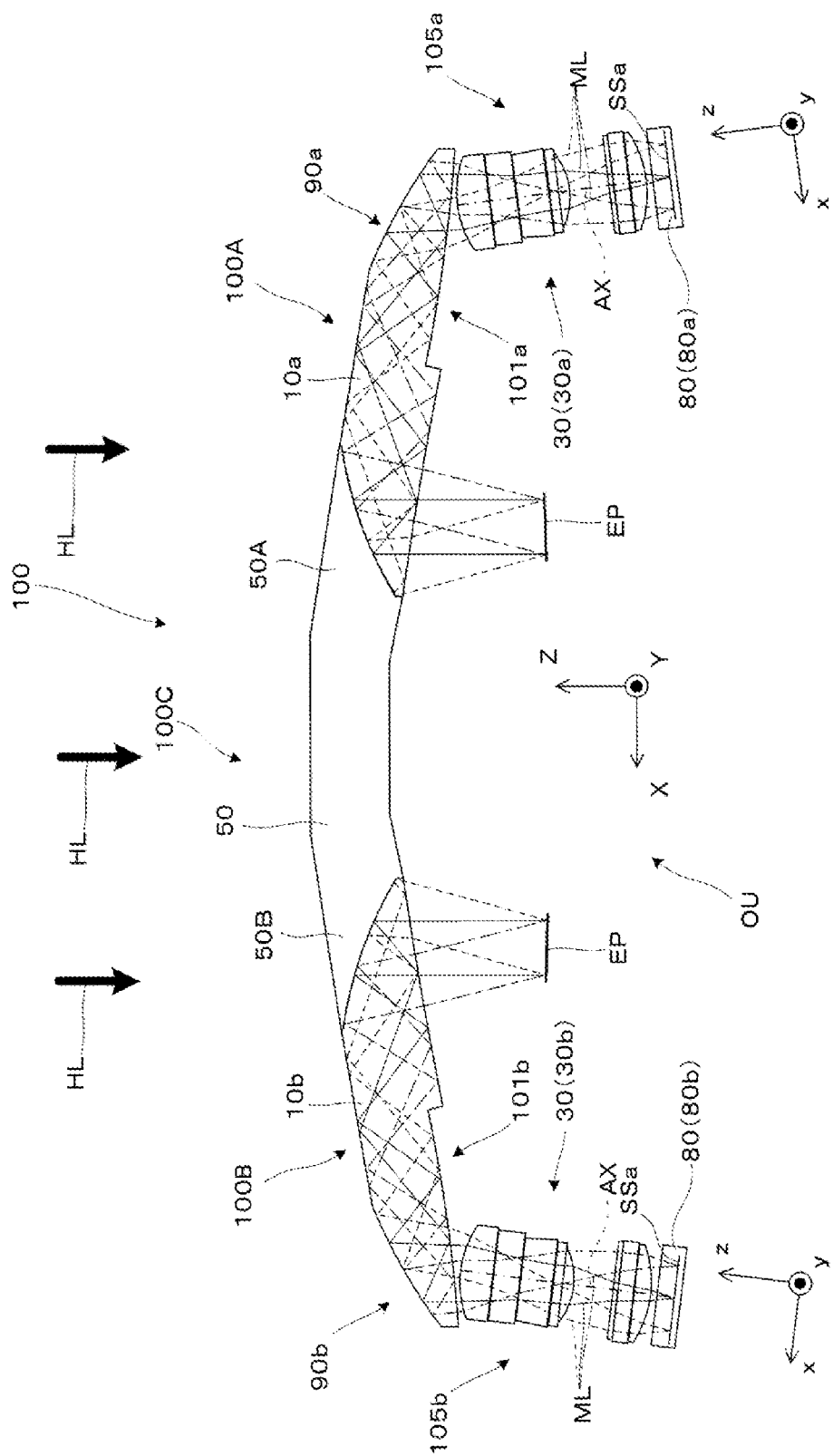
FIG. 2 illustrates an exemplary optical system constituting the virtual image display device.
Figure 3:
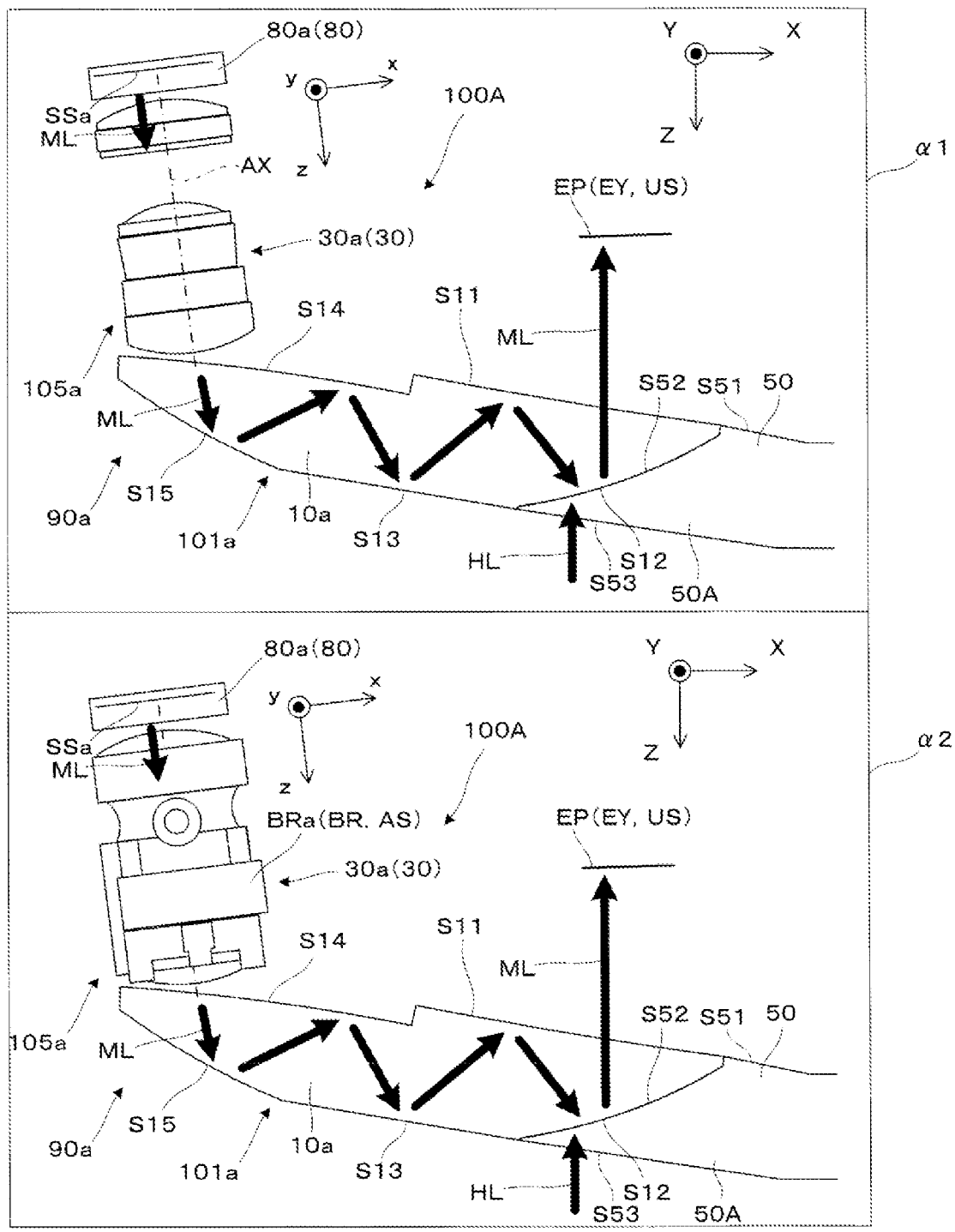
FIG. 3 is a partially enlarged view illustrating components and optical paths in the optical system.
Figure 4:
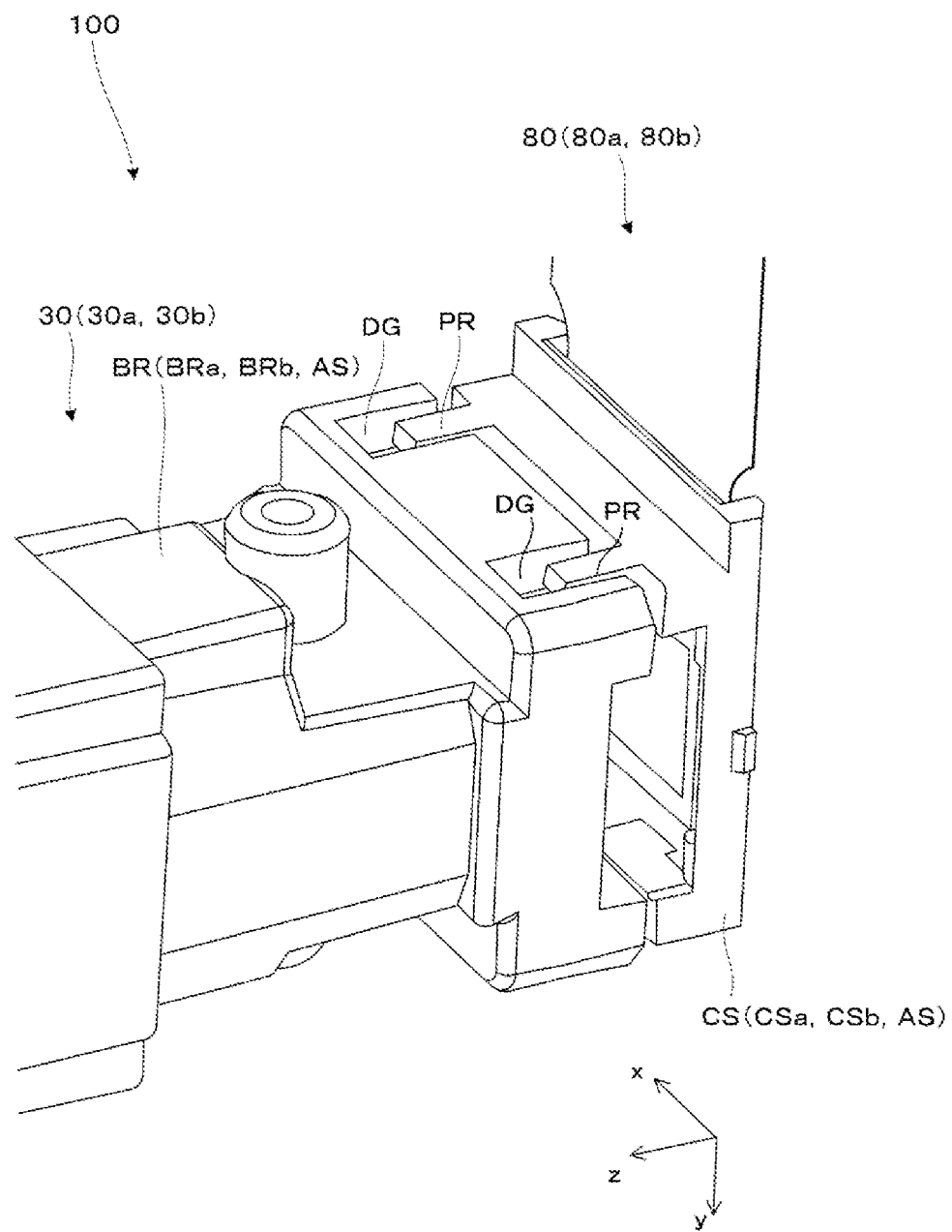
FIG. 4 is a perspective view illustrating an example of how alignment appears during assembly of the optical system.

Hereafter, a virtual image display device and an optical unit incorporated into the virtual image display device according to a first exemplary embodiment of the present disclosure will be described with reference to FIG. 1, for example. FIG. 1 is an external perspective view illustrating a schematic of a virtual image display device 100 according to the present exemplary embodiment. FIG. 2 illustrates an exemplary optical system constituting the virtual image display device 100. FIG. 3 is a partially enlarged view illustrating components and optical paths in the optical system constituting the virtual image display device 100. In addition, FIG. 4 is a perspective view illustrating an enlarged view of a portion of the optical system in order to illustrate an example of how alignment appears during assembly of the optical system.

As illustrated in FIG. 1, for example, the virtual image display device 100 according to the present exemplary embodiment is a head-mounted display (HMD) having the appearance of glasses, and allows an observer or wearer US wearing the virtual image display device 100 to recognize an image (virtual image). In addition, the virtual image display device 100 is see-through and can allow the observer or wearer US to visually recognize or observe an external image. The virtual image display device 100 is provided with a first display device 100A and a second display device 100B.

Note that in FIG. 1, for example, X, Y, and Z are an orthogonal coordinate system. A +X direction corresponds to a lateral direction in which both eyes EY of the observer or wearer US wearing the virtual image display device 100 are aligned, a +Y direction corresponds to an upward direction orthogonal to the lateral direction in which both eyes EY of the wearer US are aligned, and a +Z direction corresponds to a forward direction for the wearer US or a front surface direction. ±Y directions are parallel to a vertical axis or vertical direction.

As illustrated in FIG. 1 and FIG. 2, the first display device 100A and the second display device 100B are portions forming a right-eye virtual image and a left-eye virtual image, respectively. The right-eye first display device 100A includes a first virtual image forming optical unit 101a configured to cover the front of the observer's eye in a see-through manner and a first image forming main body unit 105a configured to form imaging light ML. The left-eye second display device 100B includes a second virtual image forming optical unit 101b configured to cover the front of the observer's eye in a see-through manner and a second image forming main body unit 105b configured to form the imaging light ML.

The first and second image forming main body units 105a and 105b are each configured by a display element (image element) 80 that is an image forming device and an optical system for forming an image, such as a projection lens 30. As exemplified in FIG. 4, the first and second image forming main body units 105a and 105b are each further configured by a case member CS, a lens barrel BR, and the like configured to house the optical system. Note that by further covering these components with a cover-like outer packaging member 105d, the components are supported and housed.

As exemplified in FIG. 2, the display element 80 is a panel-type image element (imaging light generating device) and is a self-luminous-type display device such as an organic electro-luminescence (organic EL) display device, and forms a still image or a moving image in color on a two-dimensional display surface SSa. Furthermore, the display element 80 is driven by a display control circuit (not illustrated) to perform display operations. In addition, the display element 80 is not limited to the organic EL and can be replaced with an inorganic EL, an LED array, an organic LED, a laser array, a quantum dot emission-type element, and the like. The display element 80 is not limited to a self-luminous-type imaging light generating device, and may be configured by an LCD or other light modulating element, and may form an image by illuminating the light modulating element with a light source such as a backlight. As the display element 80, a liquid crystal on silicon (LCOS; LCoS is a trade name), a digital micromirror device, and the like may be used instead of the LCD.

As illustrated in FIG. 2, for example, the projection lens 30 is a projection optical system configured to include a plurality of optical elements (four lenses in the example illustrated in FIG. 2, for example) aligned along a direction (optical axis direction) in which an optical axis (incidence-side optical axis) AX extends. In addition, as illustrated in FIG. 3 by comparing a top segment al and a bottom segment α2, for example, the plurality of lenses constituting the projection lens 30 are, for example, housed in and supported by the lens barrel BR that is integrally formed by resin molding. Note that optical components constituting the projection lens 30 (that is, the four lenses), can be configured to include an aspheric lens that includes both an axially asymmetrical aspheric surface and an axially symmetrical aspheric surface, for example. In such a case, the optical components can be used as components forming an intermediate image inside a light-guiding member by working in conjunction with an optical surface or reflective surface of the light-guiding members (light-guiding members 10, 10a, and 10b) of the first and second virtual image forming optical units 101a and 101b described hereafter.

Note that hereafter, when distinguishing between components for the right eye and the left eye, for example, the right-eye display element 80 may also be described as a display element 80a and the left-eye display element 80 may also be described as a display element 80b. Similarly, the projection lens 30 may also be described as projection lenses 30a and 30b, the case member CS may also be described as case members CSa and CSb, and the lens barrel BR may also be described as lens barrels BRa and BRb.

The first and second virtual image forming optical units 101a and 101b guide the imaging light ML, which is image light formed by the first and second image forming main body units 105a and 105b, and make external light HL and the imaging light ML visible, overlapping with each other. In the example illustrated in FIG. 1, for example, the first and second virtual image forming optical units 101a and 101b are not separate components and instead are connected in a central area to form a see-through-type light-guiding unit 100C that is an integral member. The see-through-type light-guiding unit 100C is a composite light-guiding device configured to use light guidance to furnish the observer with a binocular image. In addition, considering the above in another way, the see-through-type light-guiding unit 100C includes a pair of light-guiding members 10a and 10b and a central member 50 that is an optically transparent member, and the first virtual image forming optical unit 101a is formed by the light-guiding member 10a and an optically transparent portion 50A that constitutes the right half of the central member 50. Similarly, the second virtual image forming optical unit 101b is formed by the light-guiding member 10b and an optically transparent portion 50B that constitutes the left half of the central member 50. Note that the light-guiding members 10a and 10b may also be described collectively as the light-guiding member 10.

Note that in the foregoing, the projection lens 30 (30a and 30b) and the light-guiding member 10 (10a and 10b) can also be collectively understood to be a light-guiding system 90 (90a and 90b) guiding the imaging light ML that exits the display element 80 (80a and 80b).

Hereafter, a conceptual description will be given for an example of the light guidance of the imaging light ML by the virtual display device 100, with reference to FIG. 3 and other drawings. As previously noted, the virtual image display device 100 is configured by the first display device 100A and the second display device 100B. However, as illustrated in FIG. 2, for example, the first display device 100A and the second display device 100B have structures that are the same and have left-right symmetry (mirror symmetry) optically, and therefore FIG. 3 depicts only the first display device 100A and only structures on the right eye side are described. A description of the second display device 100B will be omitted. In addition, in FIG. 3, for example, x, y, and z are an orthogonal coordinate system where a z direction corresponds to an optical axis direction of an optical system constituting the first display device 100A, an x direction and a y direction correspond to an in-plane direction in a panel plane of the display element 80b (80) which has the z direction as a normal line direction, the x direction corresponds to a horizontal direction, and the y direction corresponds to the vertical direction.

As illustrated in FIG. 3, first, the light-guiding member 10a of the first virtual image forming optical unit 101a includes first to fifth surfaces S11 to S15 as side surfaces having an optical function. Of these surfaces, the first surface S11 and the fourth surface S14 are adjacent, and the third surface S13 and the fifth surface S15 are adjacent. Further, the second surface S12 is disposed between the first surface S11 and the third surface S13. A half mirror layer is attached to the surface of the second surface S12. The half mirror layer is a reflective film having light transmissivity, (a semi-transmissive reflective film) that is formed by depositing a metallic reflective film or a dielectric multilayer film, and is provided with appropriate reflectivity with respect to the image light. Specifically, the light-guiding member 10a includes a transmissive reflective surface that covers the front of the eye when worn by the observer.

In the first virtual image forming optical unit 101a, the optically transparent portion 50A is a member (auxiliary optical block) supporting a see-through function of the light-guiding member 10a, and is integrally fixed to the light-guiding member 10a to form one first virtual image forming optical unit 101a. The optically transparent portion 50A includes a first transmission surface S51, a second transmission surface S52, and a third transmission surface S53 as side surfaces having an optical function. The second transmission surface S52 is disposed between the first transmission surface S51 and the third transmission surface S53. The first transmission surface S51 is on an extended plane of the first surface S11 of the light-guiding member 10a, the second transmission surface S52 is a curved surface that is joined to and integral with the second surface S12, and the third transmission surface S53 is on an extended plane of the third surface S13 of the light-guiding member 10. In other words, the first surface S11 and the first transmission surface S51 are adjacent to each other, and similarly, the third surface S13 and the third transmission surface S53 are adjacent to each other, and both are aligned to be flush with each other and form a smooth surface.

An optical path of the imaging light ML will be described below briefly with reference to FIG. 3, for example. When the imaging light ML exits the display element 80a, the light-guiding member 10a causes the imaging light ML from the projection lens 30 to be incident. That is, the light-guiding member 10a receives the imaging light ML and guides the imaging light ML toward the eye EY of the observer or wearer US by, for example, reflecting the imaging light ML using the first to fifth surfaces S11 to S15. Specifically, the imaging light ML from the projection lens 30 is first incident on the fourth surface S14 and reflected by the fifth surface S15, is once again incident on the fourth surface S14 from the inner side and is totally reflected, is incident on and totally reflected by the third surface S13, and is incident on and totally reflected by the first surface S11. The imaging light ML totally reflected by the first surface S11 is incident on the second surface S12, is partially reflected while partially transmitted through the half mirror layer provided on the second surface S12, and is once again incident on and passes through the first surface S11. The imaging light ML that passes through the first surface S11 is incident, as a substantially parallel beam, on the eye EY of the wearer US or at a formation position of an exit pupil EP that is an equivalent position to the eye EY. In other words, the wearer US observes the image (virtual image) formed by the imaging light ML.

Further, the first virtual image forming optical unit 101a allows the wearer US to visually recognize the image light using the light-guiding member 10a, as described above, and also allows the wearer US to observe an external image having little distortion due to the light-guiding member 10a and the optically transparent portion 50A operating in conjunction. Here, since the third surface S13 and the first surface S11 are planes that are substantially parallel to each other (diopter is approximately 0), almost no aberration or the like occurs in the external light HL. Further, similarly, the third transmission surface S53 and the first transmission surface S51 are planes that are substantially parallel to each other. Furthermore, since the third transmission surface S53 and the first surface S11 are planes that are substantially parallel to each other, almost no aberration or the like occurs. As described above, the wearer US observes the external image that has no distortion through the central member 50 serving as an optically transparent member.

Note that the second display device 100B illustrated in FIG. 2, for example, has a structure similar to the first display device 100A discussed above. In the foregoing, the wearer US can observe a virtual image with binocular vision along with observing the external world.

When adopting a structure such as described above, alignment is performed so that virtual image display positions on the left and the right sides match. Specifically, as in the example illustrated in FIG. 4, the positions of the display element 80 and the projection lens 30 are adjusted.

In the depicted example, an excavated portion DG is provided in a side surface of the lens barrel BR (BRa and BRb) and a protruding portion PR is provided on a side surface of the case member CS so as to correspond to the excavated portion DG. A slight gap is provided between the excavated portion DG and the protruding portion PR to enable the position to be adjusted. When the lens barrel BR and the case member CS are joined, the components are fitted together, and moreover an adhesive that is a UV-curable resin is applied to the excavated portion DG, the protruding portion PR, and the like, for example (not illustrated). Given the above, a relative positional relationship between the lens barrel BR and the case member CS, while being adjustable, is fixed at a desired position. Note that when the lens barrel BR and the case member CS are joined, the area between the lens barrel BR and the case member CS may also be sealed with no gaps by wrapping the area between the lens barrel BR and the case member CS with a sealing member.

At this point, when performing a fabrication step (manufacturing step) configuring the optical system that forms the image as described above, aligning the position of each optical system is very important. In particular, when a virtual image display device includes the first display device 100A and the second display device 100B and makes an image visually recognizable in the left and right eyes, as in the virtual image display device 100 having the configuration described above, alignment for not only one eye but that also considers a balance between a right eye side and a left eye side is important. More specifically, in a state after the lens barrels BRa and BRb housing the left and right projection lenses 30a and 30b, respectively, are mounted to the see-through-type light-guiding unit 100C, positioning the case members CSa and CSb housing the display elements 80a and 80b when attaching the case members CSa and CSb to the lens barrels BRa and BRb (panel adjustment step) with a high degree of accuracy is important. Furthermore, adjusting the angle of each component (optical axis adjustment) with a high degree of accuracy is important. For example, in order to maintain balance for a state with left and right visual recognition, configuring an angle error to be within approximately ±0.2° is important.

Figure 5:
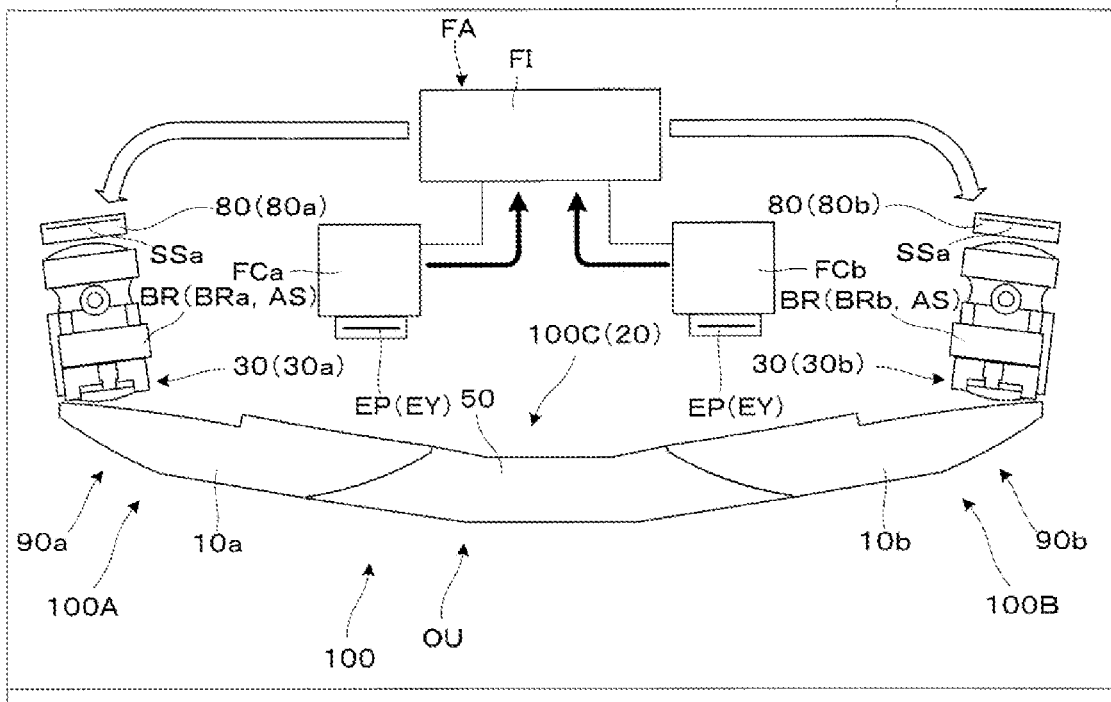
FIG. 5 is a plan view schematically illustrating alignment during assembly of the optical system.
Figure 5:
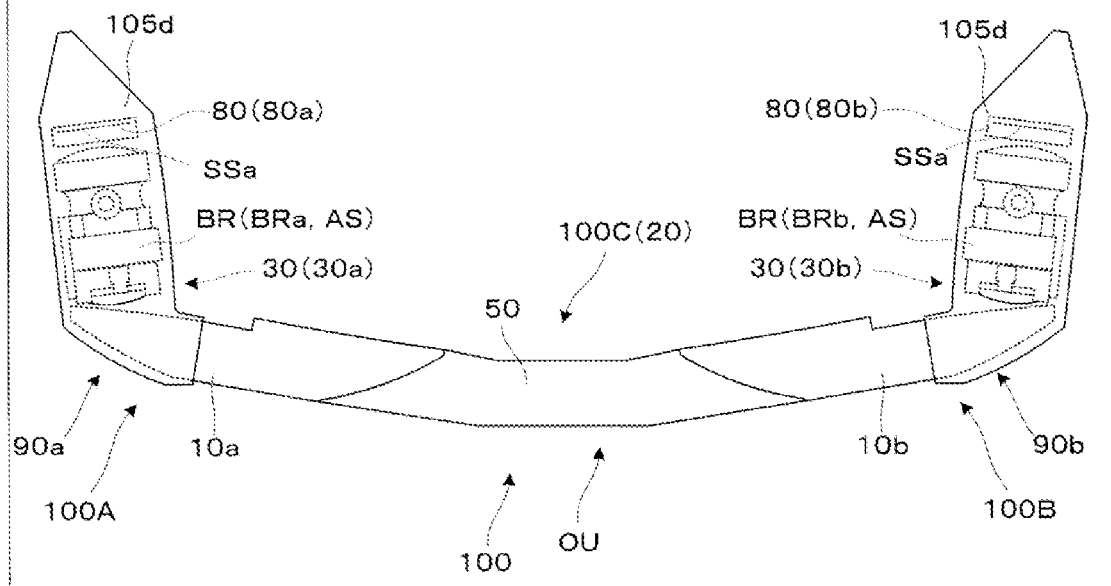

In order to perform relative positioning between left and right sides with a high degree of accuracy so as to satisfy the above-noted conditions, a mode is conceivable in which, for example, alignment (position adjustment) during assembly of the optical system is performed using an adjustment device FA configured by a pair of imaging elements (cameras) FCa and FCb and an image processing device FI, as in a top segment β1 of the plan views schematically illustrated in FIG. 5.

Describing the alignment (position adjustment) in more concrete terms, first, the imaging elements FCa and FCb are installed at the formation positions of the exit pupils EP which are imagined as positions for the left and right eyes EY of the wearer US (see FIG. 2, for example). Meanwhile, a temporary image is displayed by the optical system that has been provisionally assembled in a state where positions can be adjusted. The imaging elements FCa and FCb capture the temporary image and the imaging results are sent to the image processing device FI. The image processing device FI calculates the shift of the components in the optical systems based on the imaging results (corresponds to a visual recognition status for the wearer US) from the imaging elements FCa and FCb which are imagined as the left and right eyes, and in each optical system that has been provisionally assembled to be adjustable, the relative positional relationships are modified in accordance with the calculation results. Note that, although not depicted in the drawings, jigs are mounted to the lens barrels BRa and BRb housing the projection lenses 30a and 30b and to the display elements 80a and 80b (or to the case members CSa and CSb housing the display elements 80a and 80b illustrated in FIG. 4), enabling suitable modifications of physical positions in accordance with the calculation results described above.

As noted above, the optical system is assembled in a state satisfying the desired degree of accuracy. In the above scenario, for example, the lens barrels BRa and BRb and the case members CSa and CSb illustrated in FIG. 4 function as members configured to assemble each optical system in a state where positions were adjusted. That is, the lens barrels BRa and BRb and the case members CSa and CSb function as assembly members AS configured to assemble the first display device 100A and the second display device 100B which are in the desired positional relationship. In other words, the lens barrels BRa and BRb, for example, serving as the assembly members AS adjust relative left-right postures of the optical systems that constitute the virtual image display device 100. Note that hereafter, an optical unit OU refers to a unit in which the optical systems constituting the first and second display devices 100A and 100B were assembled by the lens barrels BRa and BRb, for example. As illustrated in a bottom segment β2, by further assembling the cover-like outer packaging member 105d and the like and, though not illustrated in the drawings, various components such as various control circuit boards, cameras, wiring members, and temples or the like, as well as adding various decorative elements or the like to the optical unit OU assembled as described above, the virtual image display device 100 becomes a product that can be furnished to an end user (consumer).

Figure 6:
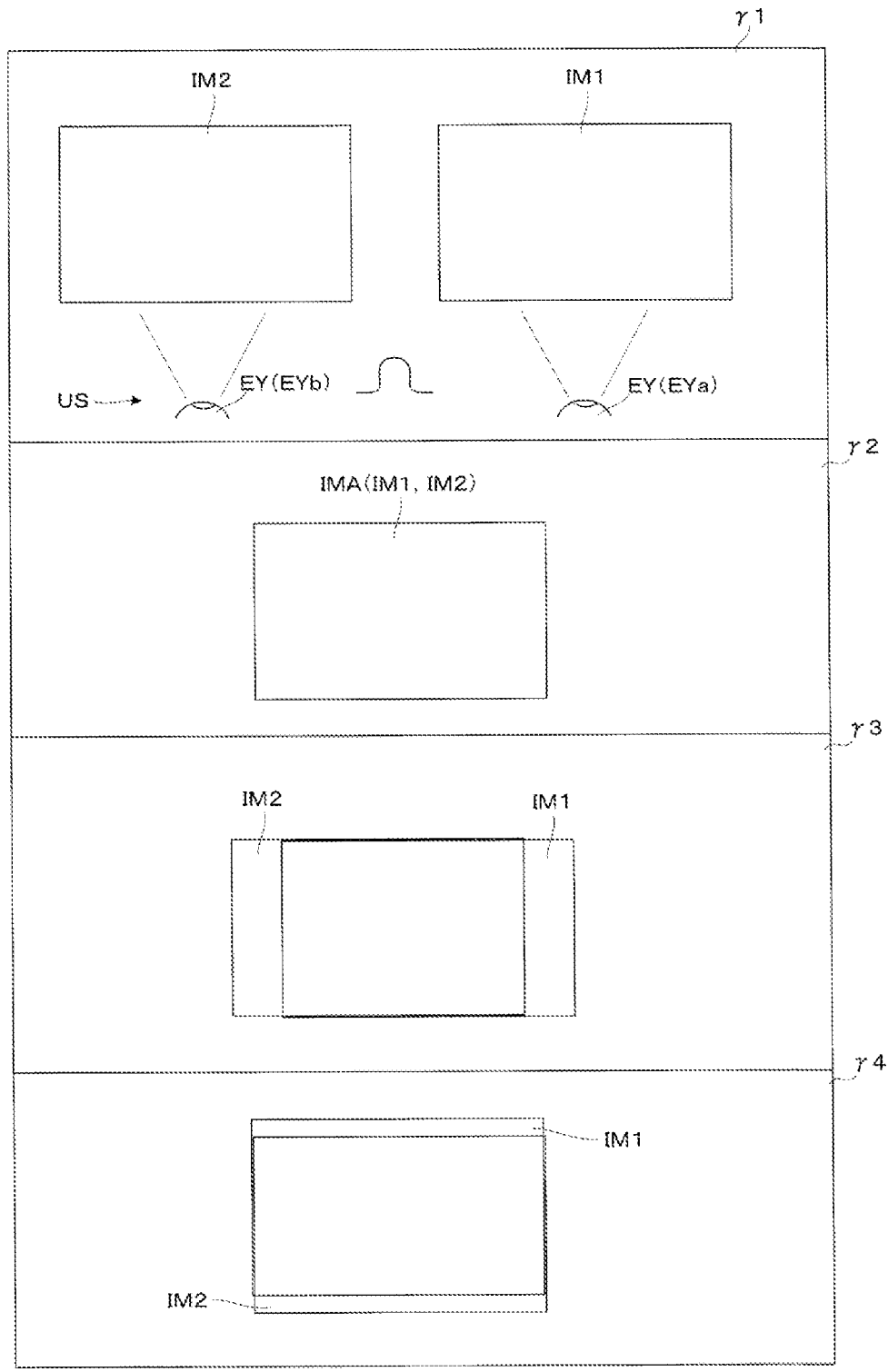
FIG. 6 is a conceptual diagram illustrating position shift of a display state.

At this point, visual recognition in a state with no shift or the like in the left and right image positions is possible with the optical unit OU in the state immediately following highly accurate assembly of the optical systems, as described with reference to the top segment β1 of FIG. 5. In other words, when described with reference to the schematic diagram illustrated in FIG. 6, images IM1 and IM2 of the images (virtual images) visually recognized with a right eye EYa and a left eye EYb of the wearer US schematically illustrated in a first field γ1 are in a state where, as schematically illustrated in a second field γ2, the images IM1 and IM2 are naturally recognized by the wearer US as an image IMA in which the images IM1 and IM2 match up with no position shift. This means that for the optical path of the imaging light ML illustrated in FIG. 2, the imaging light ML that exits with the same image position on the left and right is incident at the same angle on the eyes EY (formation position of the exit pupils EP).

In comparison, as described with reference to the bottom segment β2, for example, of FIG. 5, after the high accuracy assembly of the optical unit OU, while going through the process of assembly with other components, some distortion in the optical unit OU may arise and an incident angle of the imaging light ML may differ on the left and right sides. As a result, as schematically illustrated in a third field γ3 and a fourth field γ4 in FIG. 6, position shift may occur in the images IM1 and IM2. In the example illustrated in the third field γ3, a shift in the image occurs in the horizontal direction (that is, the X direction or x direction) in which the eyes EY of the observer are aligned. On the other hand, in the example illustrated in the fourth field γ4, a shift in the image occurs in the direction perpendicular to the horizontal direction (that is, the Y direction or y direction) in which the eyes EY of the observer are aligned. If these shifts are within a certain range, the wearer US, that is, a human, may conceivably perform processing in the brain to see the shifted images as the same image. However, such a situation places a significant burden on the wearer US, and when viewed for an extended period of time, for example, the wearer US may be greatly fatigued. This effect is particularly strong with a shift in an up-down direction (y direction, perpendicular direction) illustrated in the fourth field γ4, and the effect is preferably reduced as much as possible. In addition, even in the left-right direction (horizontal direction) illustrated in the third field γ3, depending on the conditions to achieve visual recognition, meticulous alignment is desirable. For example, when convergence is deliberately offset to display in 3D, an intended amount of shift from the matched state should be produced on the left and right sides.

Furthermore, in addition to up-down/left-right image shifting as described above, distortion, rotation, or the like of an image may also arise, which conceivably would likewise call for correction. In addition, a mode is conceivable in which correction is likewise made by taking into consideration the distortion aberration, rotation, and the like that is inherent to the optical system.

With this in mind, the present exemplary embodiment addresses a mode for the optical unit OU that is already assembled by the assembly members AS (the lens barrels BRa and BRb, the case members CSa and CSb, and the like), in which even after assembly, and in particular even after components other than the optical systems (for example, the cover-like outer packaging member 105d) are assembled, a display state can be adjusted (corrections can be made) for the first display device 100A and the second display device 100B.

Figure 7:
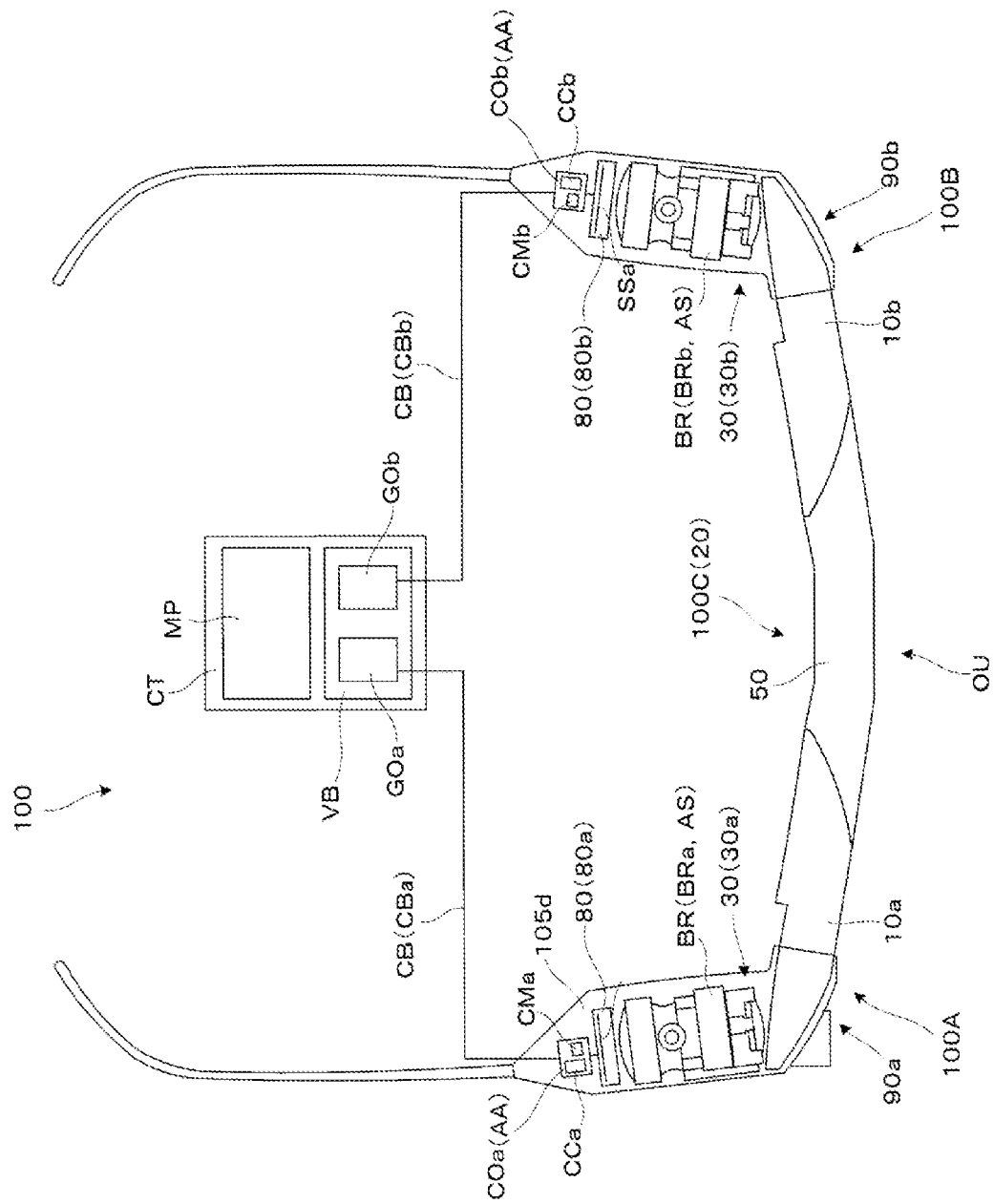
FIG. 7 is a plan view schematically illustrating an exemplary post-assembly state of the optical system.
Figure 8:
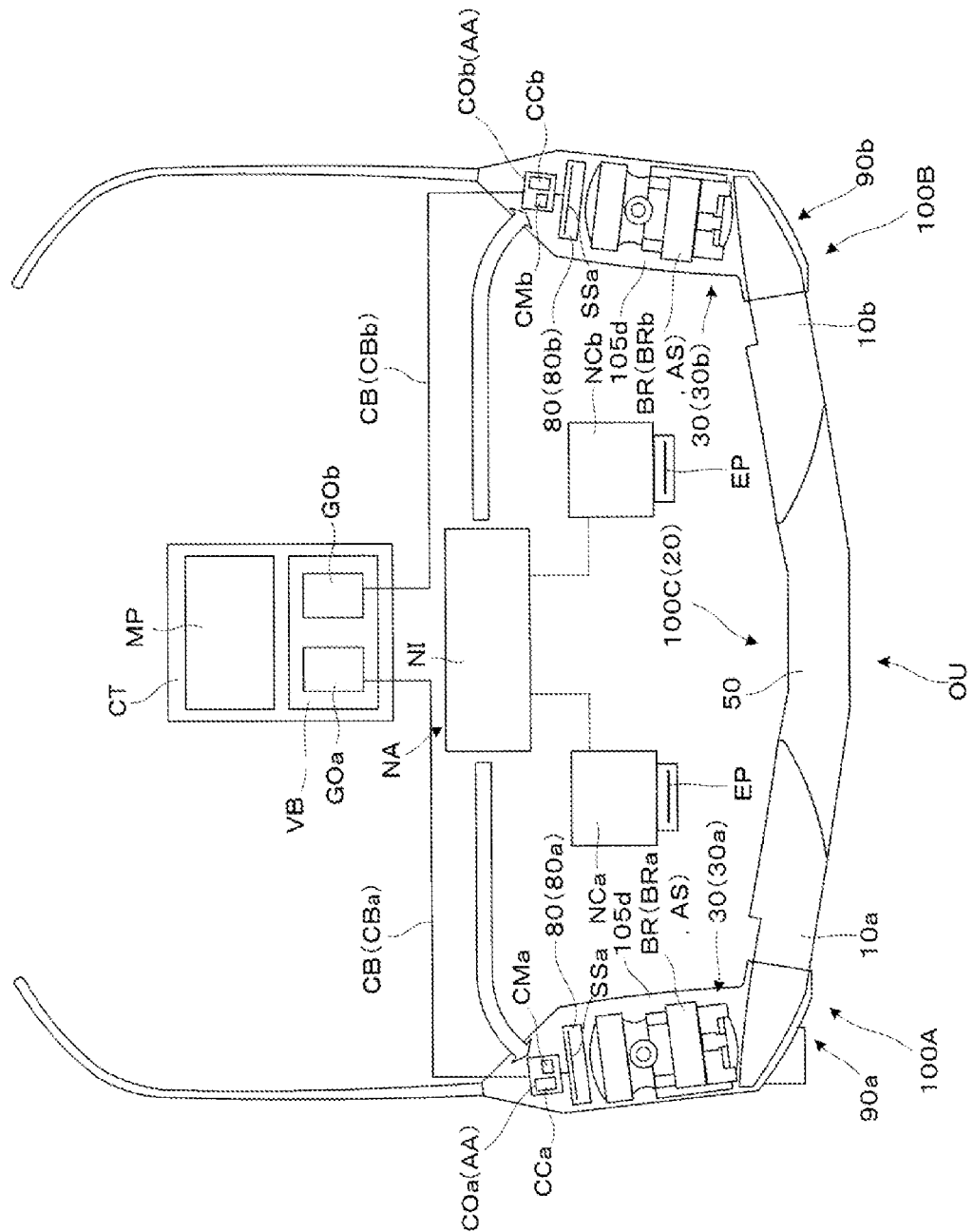
FIG. 8 is a plan view schematically illustrating adjustment of the display state after the optical system illustrated in FIG. 7 is assembled.
Figure 9:
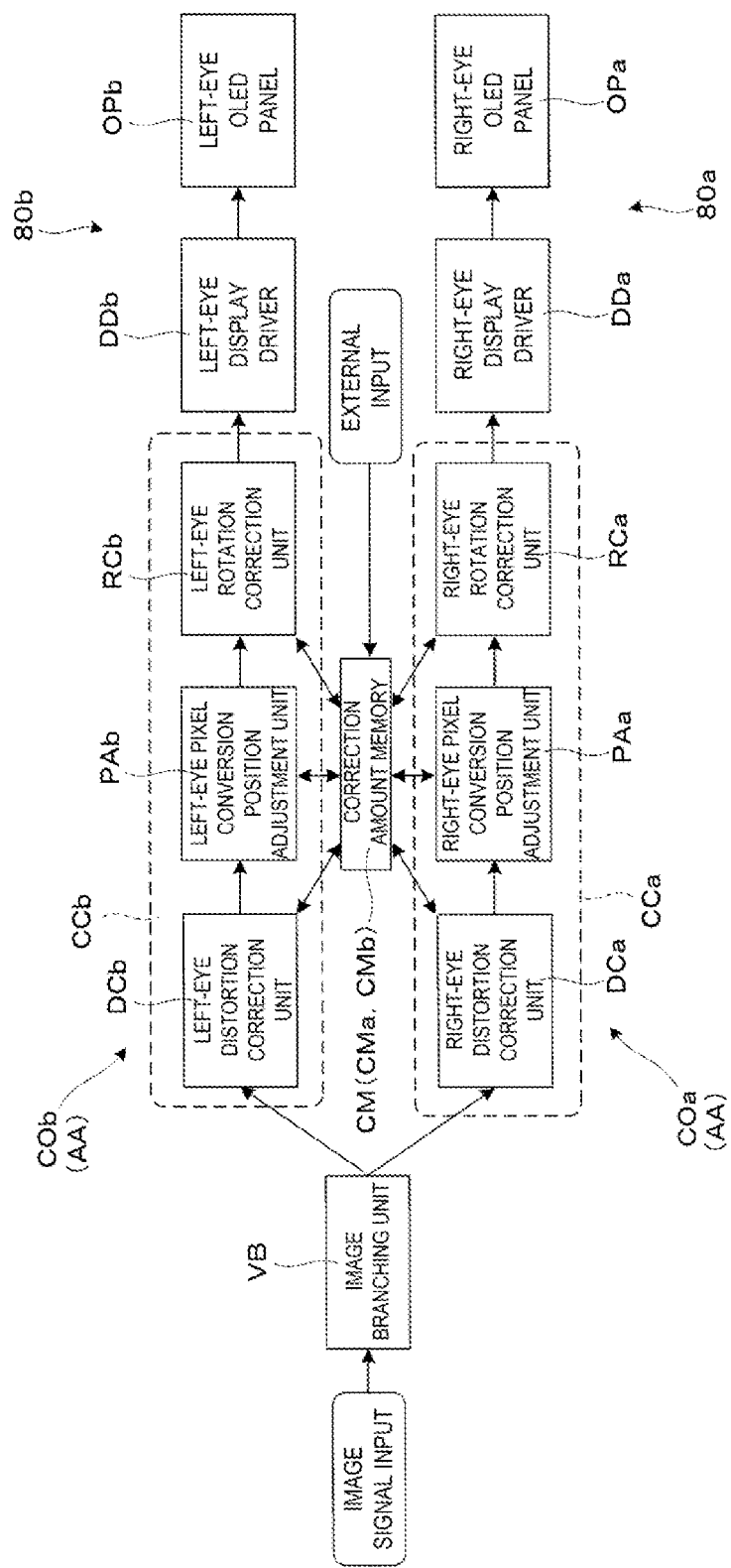
FIG. 9 is a block diagram illustrating exemplary image processing for adjusting the display state.

Hereafter, adjustment of a display state in the virtual image display device 100 after assembly by the assembly members AS will be discussed with reference to FIG. 7, for example. FIG. 7 is a plan view schematically illustrating an exemplary virtual image display device 100 after the optical systems constituting the optical unit OU are assembled and in a state where another member is mounted to the virtual image display device 100. FIG. 8 is a plan view schematically illustrating adjustment of the display state of the virtual image display device 100 illustrated in FIG. 7. In addition, FIG. 9 is a block diagram illustrating exemplary image processing for adjusting the display state under the conditions in FIG. 8.

At this point, in the example illustrated in FIG. 7 and other drawings, panel display position adjustment (adjustment of a display area) on the display surface SSa of the display element 80 will be described for a case where the display state can be adjusted by digital adjustment (correction), as an example of optical adjustment after assembly of the optical systems.

First, FIG. 7 illustrates an exemplary virtual image display device 100 in a state after the optical unit OU is assembled, in which various components such as a control device (controller) CT were further attached. In other words, FIG. 7 depicts an example of the virtual image display device 100 as a nearly finished product that could be turned over to an end user (consumer, purchaser). However, this case assumes that as a result of going through the process of attaching various components after assembling the optical unit OU, shifts such as distortion have occurred in the optical systems constituting the optical unit OU, calling for correction. That is, after being constructed into a finished product, the virtual image display device 100 corrects a shift in the left and right image positions that arises due to construction after assembling the optical unit OU.

In addition, as already discussed, the control device CT for controlling and outputting image information for display, receiving various operation commands from the wearer US, and performing various types of control is provided in the exemplary virtual image display device 100 illustrated in FIG. 7, and the first display device 100A and the second display device 100B are connected to the control device CT via a cable CB (CBa and CBb). In addition to a main control unit MP configured by a CPU or the like, the control device CT is also provided with an image branching unit VB, and is also provided with a first output unit GOa configured to output image data to the right-eye first display device 100A and a second output unit GOb configured to output image data to the left-eye second display device 100B.

Moreover, in the illustrated example, a first correction unit COa is provided to the first display device 100A and a second correction unit COb is provided to the second display device 100B as correction circuit units for adjusting the display state. The first correction unit COa includes a first correction amount memory CMa and a first correction circuit CCa. Similarly, the second correction unit COb includes a second correction amount memory CMb and a second correction circuit CCb. Note that a unit that includes the first correction unit COa and the second correction unit COb in addition to the first display device 100A and the second display device 100B may be understood to be the optical unit OU. In other words, the optical unit OU is also treated as including a printed wired board and the like, in addition to optical members. In addition, an optical unit OU that includes the printed wired board and the like constituting the first correction unit COa or the like can be a commercially oriented product.

The first and second correction amount memories CMa and CMb are able to write information related to a suitable correction amount, and the first and second correction circuits CCa and CCb correct an image, that is, adjust a panel display position (adjust the display region) based on the content recorded in the first and second correction amount memories CMa and CMb. In other words, by inputting the suitable correction amount (adjustment amount) to the first and second correction amount memories CMa and CMb, the first and second correction units COa and COb function as post-assembly adjustment devices AA configured to adjust the display state of the first display device 100A and the second display device 100B that have gone through processing after the optical unit OU is assembled. Note that the first and second correction units COa and COb serving as the post-assembly adjustment devices AA perform conversion processing on an image signal branched into two, corresponding to the first display device 100A and the second display device 100B, and the conversion processing differs between the two branched signals. In other words, the first correction unit COa and the second correction unit COb separately and independently undergo conversion processing.

Hereafter, adjustment of the display state, that is, the display area, (an adjustment method) in the virtual image display device 100 illustrated in FIG. 7 will be discussed with reference to FIG. 8 and FIG. 9.

First, as illustrated in FIG. 8, using an adjustment device NA configured by a pair of imaging elements (cameras) NCa and NCb and an image processing device NI, the display state after assembly of the optical systems is adjusted in the virtual image display device 100 depicted in FIG. 7. That is, the adjustment device NA measures the correction amount to be recorded in the first and second correction amount memories CMa and CMb.

Describing the measurement of the correction amount (measurement of adjustment amount for the display area) in more concrete terms, first, the imaging elements NCa and NCb are installed at the formation positions of the exit pupils EP which are imagined as positions for the left and right eyes EY of the wearer US (see FIG. 2, for example). Meanwhile, a temporary image is displayed from the optical systems that have already been assembled and fixed. The imaging elements NCa and NCb capture the temporary image and the imaging results are sent to the image processing device NI. The image processing device NI calculates the shift of the components in the optical systems based on the imaging results (corresponds to a visual recognition status for the wearer US) from the imaging elements NCa and NCb which are imagined as the left and right eyes. Furthermore, in accordance with the calculation results, the image processing device NI measures the amount of correction called for in each of the first display device 100A and the second display device 100B (measurement of adjustment amount for the display area) and outputs the measurement results to the first and second correction units COa and COb. In other words, information related to the suitable correction amount (adjustment amount for the display area) is input to the first and second correction amount memories CMa and CMb of the first and second correction units COa and COb.

FIG. 9 is a block diagram for describing a more concrete example for the first correction unit COa and the second correction unit COb described above. In the depicted example, in the first correction unit COa, the first correction circuit CCa is configured by a right-eye distortion correction unit DCa, a right-eye pixel conversion position adjustment unit PAa, and a right-eye rotation correction unit RCa. The right-eye distortion correction unit DCa is a correction circuit (distortion correction circuit) for correcting distortion due to the optical system that arises in an overall image to be displayed for the right eye. The right-eye pixel conversion position adjustment unit PAa is an adjustment circuit (conversion position adjustment circuit) configured to adjust a conversion position (correct a shift) of a display position up-down/left-right in pixel units. The right-eye rotation correction unit RCa is a correction circuit (rotation correction circuit) for correcting rotation due to the optical system that arises in the overall image to be displayed for the right eye. These components acquire appropriate information, as necessary, from the correction amount memory CM, that is, from the first correction amount memory CMa. Note that for the correction amount memory CM (first correction amount memory CMa), the correction amount is input in advance as an external input, as in the mode using the adjustment device NA illustrated in FIG. 8.

Note that for the second correction unit COb, similarly, the second correction circuit CCb is configured by a left-eye distortion correction unit DCb, a left-eye pixel conversion position adjustment unit PAb, and a left-eye rotation correction unit RCb, and that these acquire appropriate information, as necessary, from the correction amount memory CM, that is, from the second correction amount memory CMb.

Hereafter, various kinds of signal processing as well as image formation based on the signal processing will be described in simple terms. For example, when the image signal is input to the control device (controller) CT and corresponding image data (image signal) for the left or right side is output from the image branching unit VB, in the right-eye first correction unit COa, first, the right-eye distortion correction unit DCa corrects distortion for the overall image, after which a pixel position is adjusted by the right-eye pixel conversion position adjustment unit PAa, and finally the right-eye rotation correction unit RCa corrects rotation for the overall image. The image data (image signal) that has gone through the above processing is output to a right-eye display driver DDa constituting the display element 80a and the imaging light ML that corresponds to the image data (image signal) exits a right-eye OLED panel OPa similarly constituting the display element 80a.

Note that the left-eye second correction unit COb, the left-eye OLED panel OPb constituting the display element 80b, and the left-eye OLED panel OPb function similarly for image formation for the left eye.

In addition, for purposes of description, in the above the first correction circuit CCa is configured by three elements: the right-eye distortion correction unit DCa, the right-eye pixel conversion position adjustment unit PAa, and the right-eye rotation correction unit RCa, but in reality the first correction circuit CCa can be configured by a single chip (circuit) that performs processes equivalent to these units. The same is true of the second correction circuit CCb of the second correction unit COb.

Figure 10:
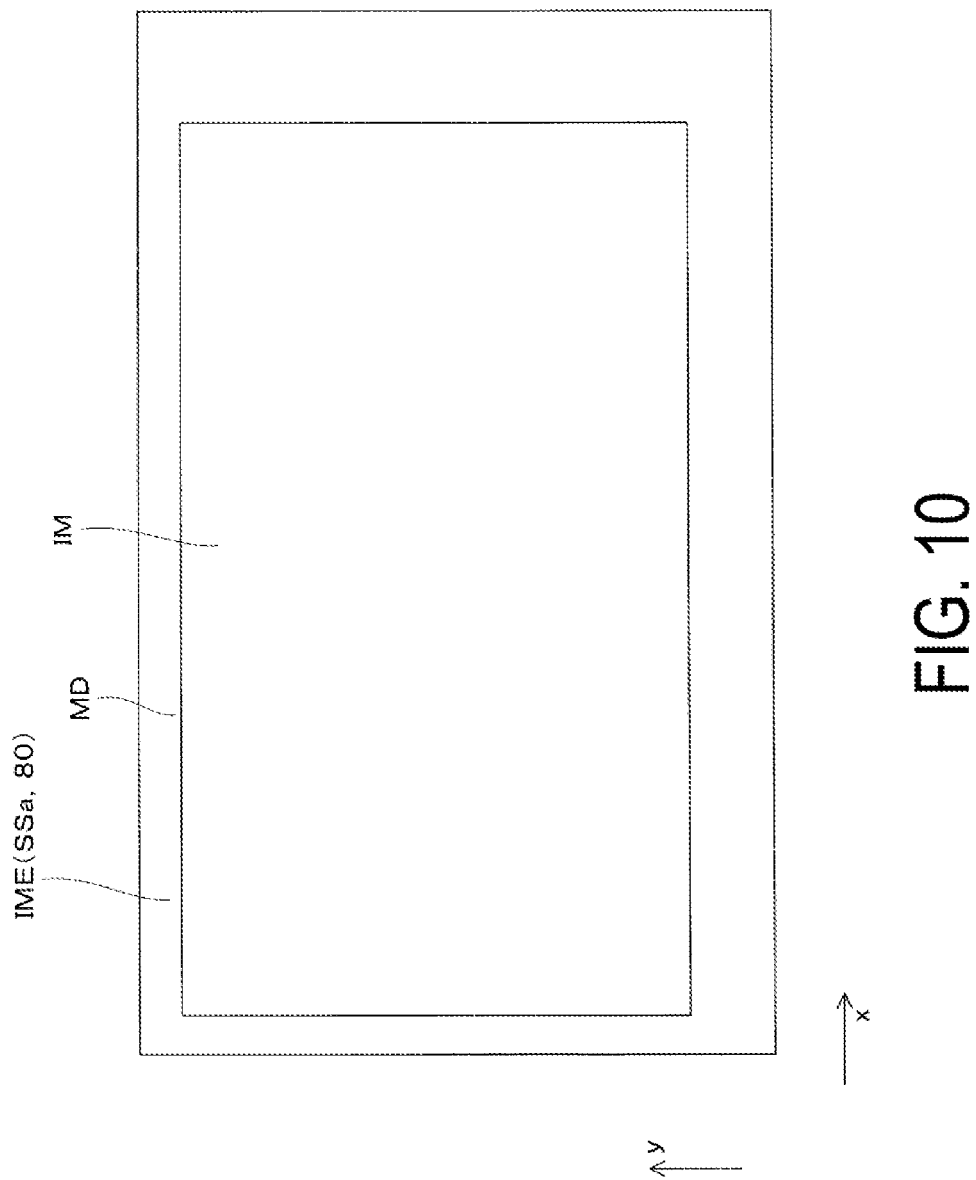
FIG. 10 is a schematic view illustrating an exemplary display surface of a display element.

Hereafter, a specific mode will be described for adjustment processing of the image signal, with reference to the schematic diagram of the display surface SSa of the display element 80 illustrated in FIG. 10. Here, as one example, the input image signal (screen resolution) is 1920×1080 (FHD) and the corresponding display area of the display surface SSa of the display element 80 is designated as a display area IM. In comparison, the number of effective pixels of a panel of the display surface SSa of the display element 80 is 1960×1120=(1920+40)×(1080+40). In other words, in the drawings, a display effective area IME indicating the maximum area of the display surface SSa of the display element 80 is broad compared to the display area IM of the display element 80 that corresponds to the input image signal, and includes a margin region MD with ±20 pixels for adjustment up-down and left-right. Put another way, the display area IM of the display element 80 is narrower than the display effective area IME of the display element 80, and the display element 80 has the margin region MD such that the display area IM is variable in the display effective area IME. With the above-noted configuration, in the first and second correction units COa and COb serving as the post-assembly adjustment devices AA, not only are the right-eye and left-eye pixel conversion position adjustment units PAa and PAb, for example, able to make an adjustment in the X direction (right-left direction, horizontal direction), which is a first direction in which the first display device 100A and the second display device 100B align, but the adjustment units PAa and PAb can also make an adjustment in the Y direction (up-down direction, perpendicular direction), which is a second direction intersecting with the X direction, as a position adjustment for the virtual image that is to be visually recognized.

Note that in the depicted example, in the display effective area IME, the margin region MD in each direction is defined so as to enable shifting the display position by adding 10 pixels on the top, 30 pixels on the bottom, 5 pixels on the left, and 35 pixels on the right to the display area IM when the original image signal is at a standard position. In addition, in the present exemplary embodiment, as described with reference to FIG. 4, for example, positioning is performed in the panel adjustment step, for example, where the case members CSa and CSb are attached to the lens barrels BRa and BRb and at the time of positioning, the display area IM is aligned with the standard position. In order to enable the processing described above, the first and second correction units COa and COb serving as the post-assembly adjustment devices AA include an image processing circuit configured to convert the input image signal and output the converted image signal to the display element 80. In particular, the first and second correction units COa and COb include an enlargement processing circuit configured to convert the input image signal to an image signal having a greater number of pixels than the input image signal, that is, to an image signal adapted to the display effective area IME in the display element 80 (perform resolution conversion).

Furthermore, in the present exemplary embodiment, in addition to shift correction in the up-down and left-right directions using the various margins described above, rotation adjustment and the like is also performed, at which time, when information for an edge part of an image is cut off by rotation or the like, the image may be displayed in the cut-off state. Alternatively, a limit may be placed on the rotation or the like depending on an amount of position shift (position correction amount), for example. In other words, the first and second correction units COa and COb serving as the post-assembly adjustment devices AA may be configured as a mode that performs at least one, or both, of parallel displacement of the display position and rotation of the display position within a range of a number of pixels of the image signal increased due to conversion by the enlargement processing circuit described above.

In addition, the adjustment amount that can be handled as the shift correction in the above scenario (±20 pixels), when converted to optical axis shift (angle shift), corresponds to approximately ±0.3° up-down/left-right. On the other hand, the adjustment amount when performing positioning in the various steps during assembly of the optical systems in the panel adjustment step or the like, described with reference to FIG. 4 and FIG. 5, for example, may conceivably be configured to be adjustable by approximately ±3° up-down/left-right in an optical axis angle. In other words, the adjustment amount in assembly using the assembly members AS (the lens barrels BRa and BRb, for example) is greater than the adjustment amount in readjustment with the first and second correction units COa and COb serving as the post-assembly adjustment devices AA.

In addition, in the foregoing, the lens barrels BRa and BRb and the like serving as the assembly members AS make physical adjustments to positions to assemble components while making an adjustment of relative positions of the display elements 80a and 80b and the light-guiding systems 90a and 90b. The first and second correction units COa and COb serving as the post-assembly adjustment devices AA make electronic adjustments to positions through digital processing (image processing) that adjusts the display area in the display elements 80a and 80b. Note that the virtual image display device 100 may be a commercially oriented product regardless of whether adjustment was made during adjustment with the post-assembly adjustment device AA, and conceivably may include or not include adjustment using the post-assembly adjustment device AA as a manufacturing step (one step in a manufacturing method) of the virtual image display device 100.

In the foregoing, the virtual image display device 100 according to the present exemplary embodiment includes the right-eye first display device 100A, the left-eye second display device 100B, lens barrels BRa and BRb or the like serving as the assembly members AS configured to assemble the first display device 100A and the second display device 100B, and the first and second correction units COa and COb serving as the post-assembly adjustment devices AA configured to adjust the display state of the first display device 100A and the second display device 100B assembled by the assembly members AS. In the virtual image display device 100 described above, after assembling the first display device 100A and the second display device 100B using the assembly members AS such as the lens barrels BRa and BRb, even when a new shift in the image position between the left and right sides occurs, the shift can be corrected by adjusting the display state of the first display device 100A and the second display device 100B using the first and second correction units COa and COb serving as the post-assembly adjustment devices AA.

Figure 11:
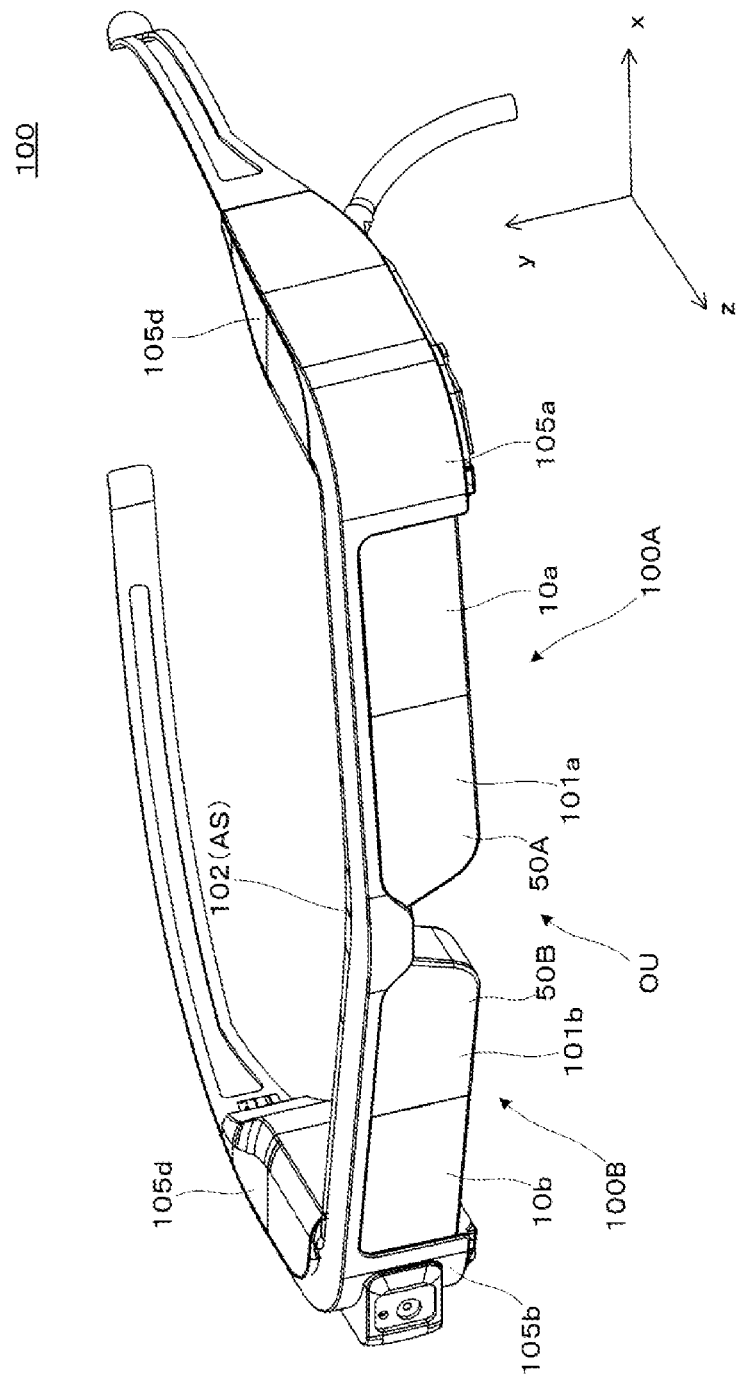
FIG. 11 is an external perspective view illustrating a modified example of the virtual image display device.

Hereafter, a modified example of the virtual image display device 100 according to the present exemplary embodiment will be described with reference to an external perspective view as illustrated in FIG. 11. In the present modified example, the first display device 100A and the second display device 100B are separated and independent. The first display device 100A and the second display device 100B are connected via a frame 102. In this respect, that is, where the frame 102 functions as the assembly member AS configured to assemble the optical system constituting the first display device 100A and the optical system constituting the second display device 100B, the present modification differs from the mode illustrated in FIG. 1, for example, that constitutes an integral member connected by the see-through-type light-guiding unit 100C. In this case also, the optical system (optical unit OU) can be assembled with a high degree of accuracy, and after the optical system (optical unit OU) is assembled, even when a new shift in the image position between the left and right sides occurs, the shift can be corrected.

Second Embodiment

Hereafter, a virtual image display device and the like according to a second exemplary embodiment will be described with reference to FIG. 12. Note that the present exemplary embodiment is similar to the case given in the first exemplary embodiment, except for portions of content for the image processing for adjusting the display state after the optical system is assembled, and the overall external appearance and the like is similar to the description in the first exemplary embodiment that referenced FIG. 1, for example. Therefore, the overall external appearance is omitted from the drawings and the drawings noted above will be referred to as appropriate, when necessary.

Figure 12:
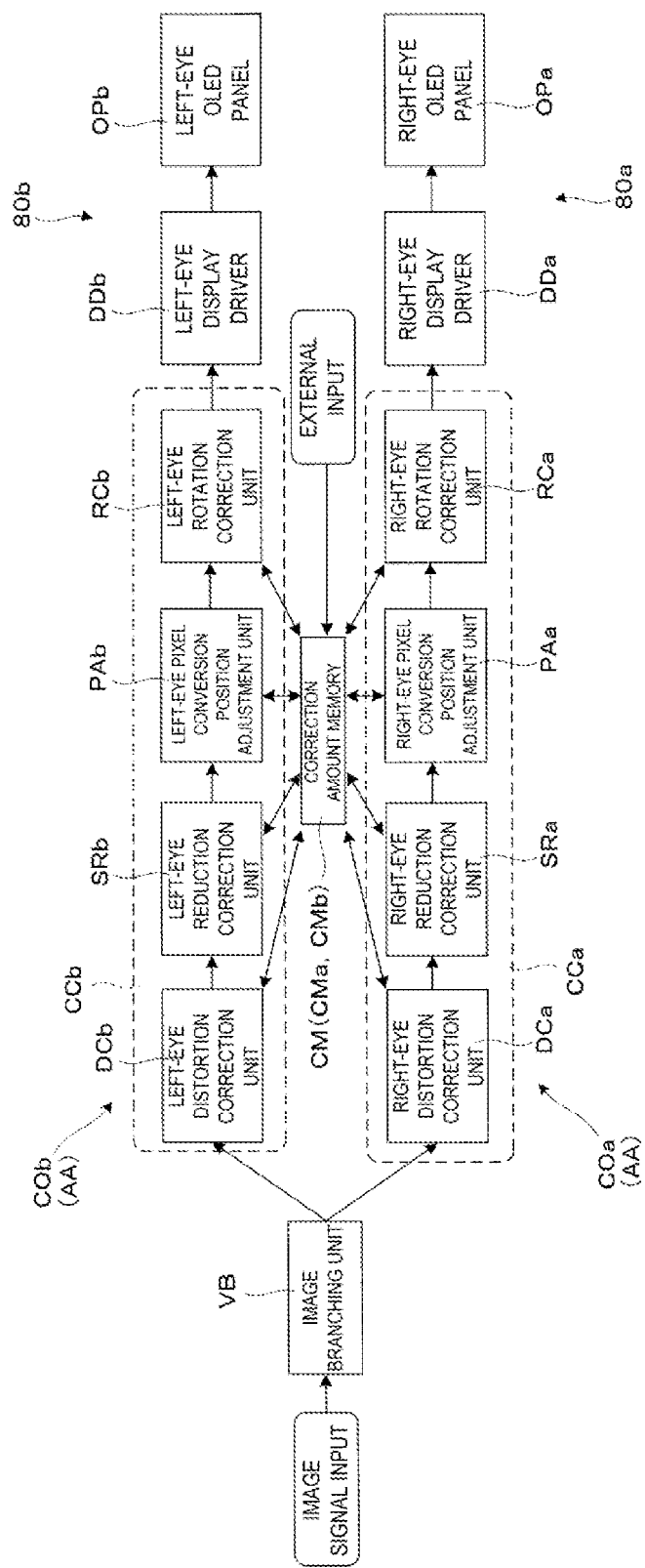
FIG. 12 is a block diagram illustrating exemplary image processing for adjusting a display state of a virtual image display device according to a second exemplary embodiment.

FIG. 12 is a block diagram illustrating exemplary image processing for adjusting a display state in the virtual image display device according to the present exemplary embodiment, and corresponds to FIG. 9.

As is clear from comparison with FIG. 9, in the example illustrated in FIG. 12, providing a right-eye reduction correction unit SRa and a left-eye reduction correction unit SRb in the first correction circuit CCa and the second correction circuit CCb of the first correction unit COa and the second correction unit COb differs from the first exemplary embodiment.

For example, as described with reference to FIG. 10, one aspect illustrated in the first exemplary embodiment was configured to have the display area IM corresponding to the input image signal be narrower than the display effective area IME of the display surface SSa, and to be provided with the margin region MD such that the display area IM is variable. Looked at in another way, the input image signal was a signal corresponding to 1920×1080 (FHD), whereas increasing the number of effective pixels of the display element 80 to the larger 1960×1120 enabled the margin region MD to be provided.

However, the component used as the display element 80 may conceivably be a component corresponding to 1920×1080 (FHD), similarly to the input image signal, for example. In such a case, a region corresponding to the margin region MD in FIG. 10 cannot be adequately ensured and a great deal of information for an edge part of the screen may be missing when position adjustment or rotation adjustment is performed as a correction.

In comparison, in the present exemplary embodiment, by providing the right-eye reduction correction unit SRa and the left-eye reduction correction unit SRb to the first correction unit COa and the second correction unit COb that serve as the image processing circuits and performing reduction processing ahead of time to place a margin around the periphery, enabling position adjustment and rotation adjustment without causing information loss. This enables such information loss to be prevented. In other words, in the present exemplary embodiment, the first and second correction units COa and COb serving as the post-assembly adjustment devices AA have a configuration that includes, as the image processing circuits, the right-eye and left-eye reduction correction units SRa and SRb serving as reduction processing circuits configured to convert the input image signal to an image signal having a smaller number of pixels than a number of pixels of the display effective area IME in the display element 80 (perform resolution conversion).

In the example in FIG. 12, of the various components constituting the first correction unit COa, for example, first, the right-eye distortion correction unit DCa corrects distortion for the overall image, after which the right-eye reduction correction unit SRa performs reduction processing, followed by the right-eye pixel conversion position adjustment unit PAa adjusting the pixel position, and finally the right-eye rotation correction unit RCa corrects rotation for the overall image. Note that similar processing is performed in the second correction unit COb to which the left-eye reduction correction unit SRb is provided.

Note that in the mode described above, the first and second correction units COa and COb serving as the post-assembly adjustment devices AA, for example, may be configured as a mode that performs at least one, or both, of parallel displacement of the display position and rotation of the display position within a range of a difference between a number of pixels of the image signal decreased due to conversion by the right-eye and left-eye reduction correction units SRa and SRb serving as the reduction processing circuits and the number of pixels of the display effective area IME in the display element 80.

In the present exemplary embodiment, after an optical system (optical unit OU) is assembled, even when a new shift in the image position between the left and right sides occurs, the shift can be corrected by adjusting the display state of the first display device 100A and the second display device 100B using the first and second correction units COa and COb serving as the post-assembly adjustment devices AA.

Third Embodiment

Figure 13:
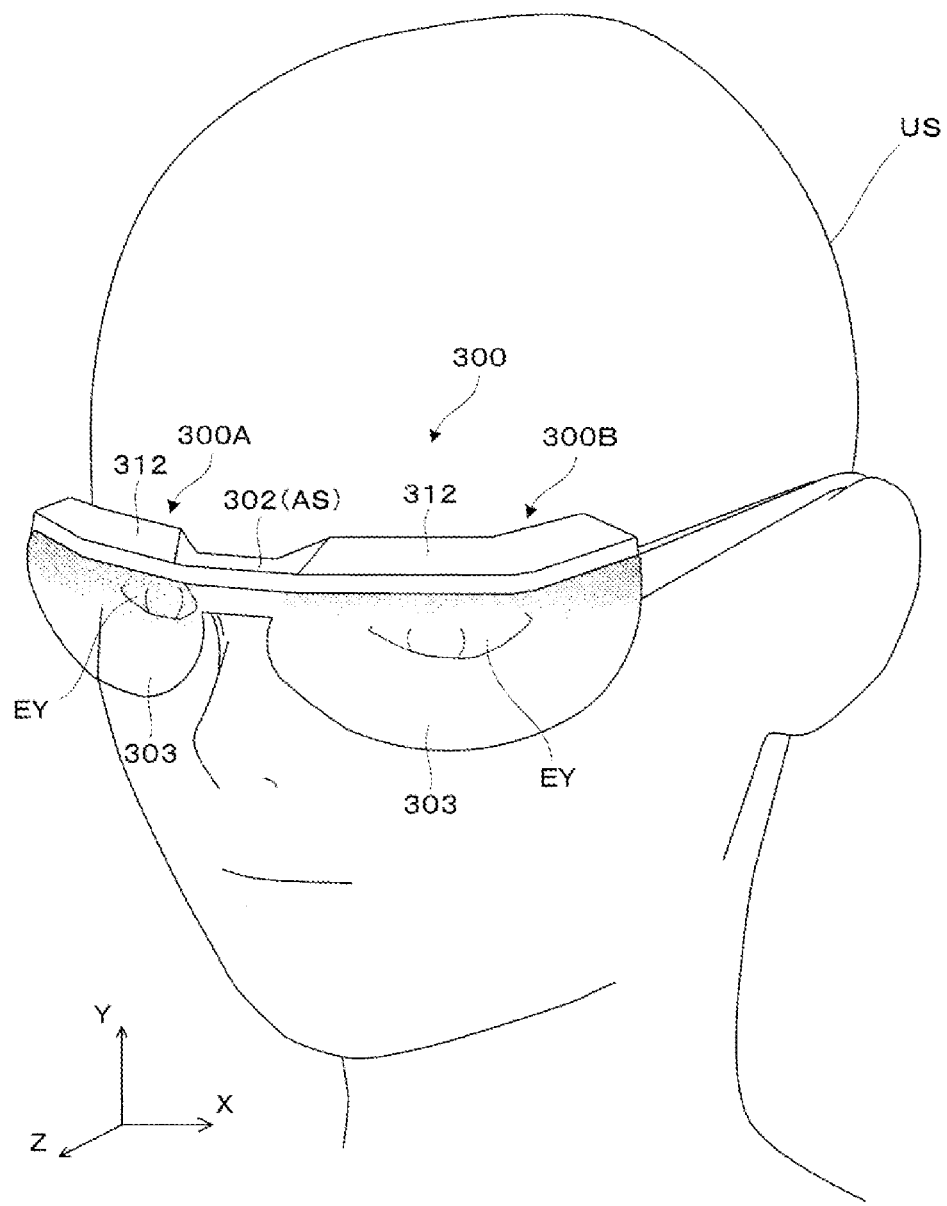
FIG. 13 is an external perspective view illustrating a schematic of a virtual image display device according to a third exemplary embodiment.
Figure 14:
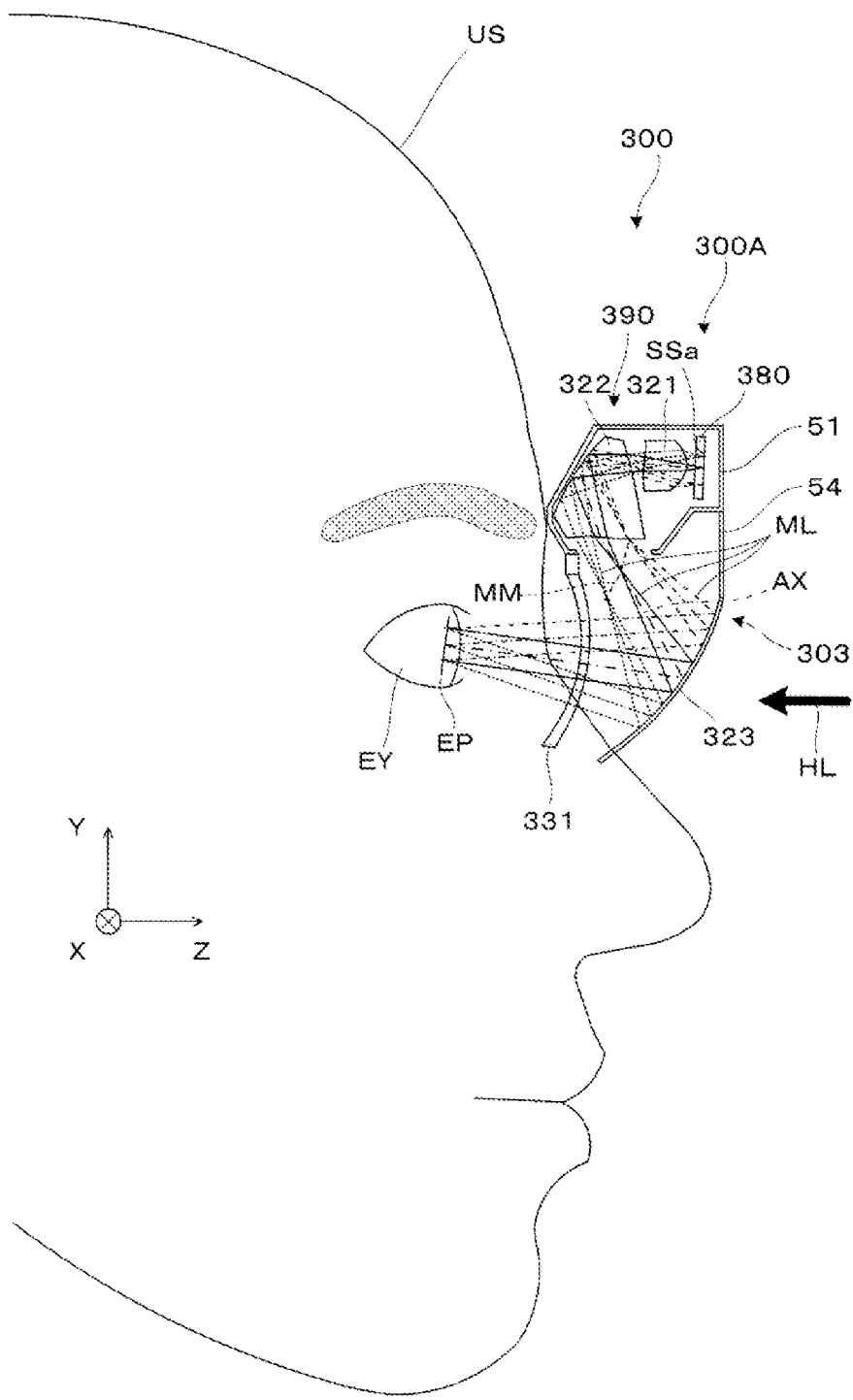
FIG. 14 is a lateral cross-sectional view illustrating an exemplary internal structure of the virtual image display device.
Figure 15:
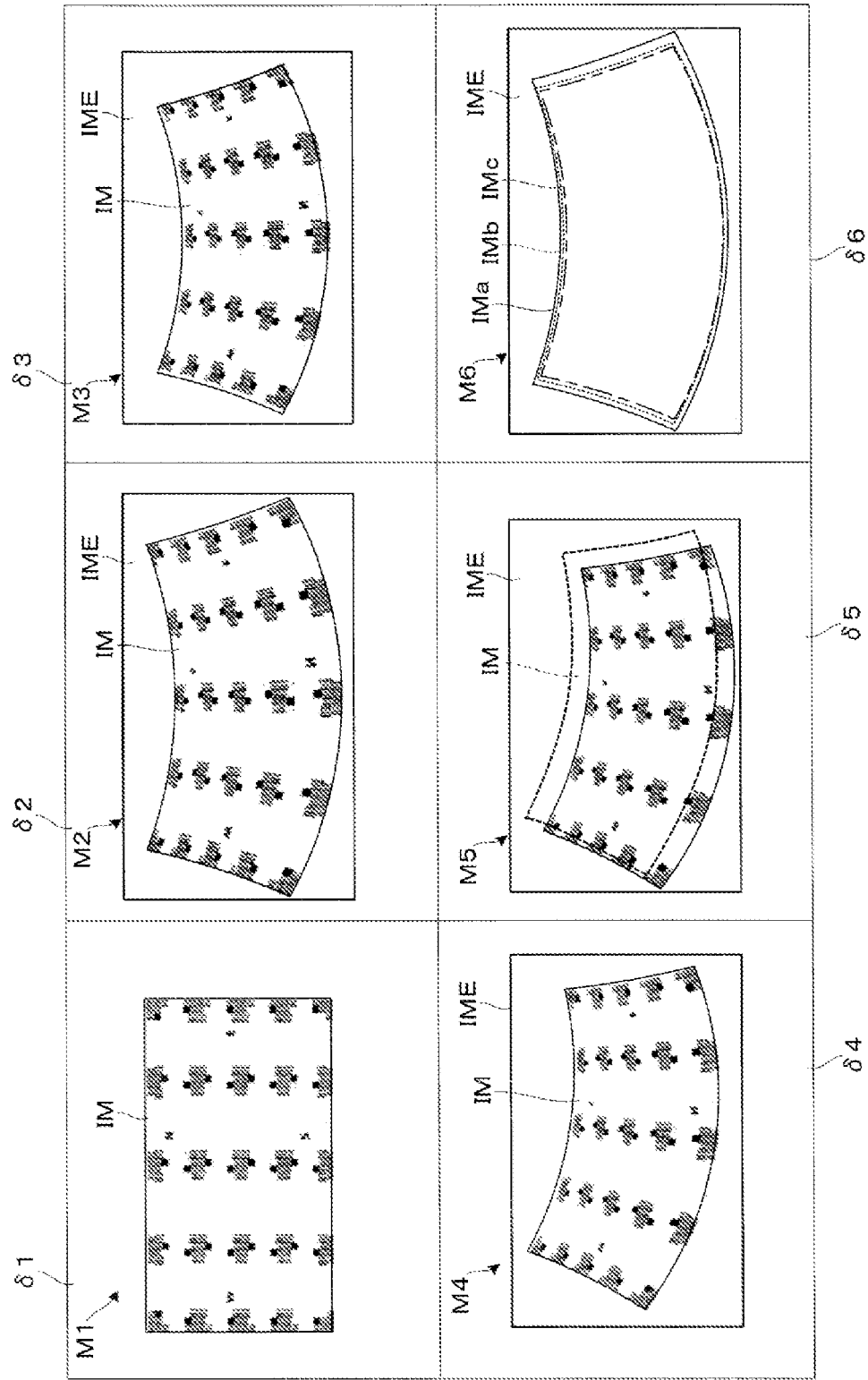
FIG. 15 is a conceptual diagram illustrating correction of distortion and rotation that may occur.

Hereafter, a virtual image display device and the like according to a third exemplary embodiment will be described with reference to FIG. 13, for example. FIG. 13 is an external perspective view illustrating a schematic of a virtual image display device 300 according to the present exemplary embodiment. FIG. 14 is a lateral cross-sectional view illustrating an exemplary internal structure of the virtual image display device 300. In addition, FIG. 15 is a conceptual diagram illustrating correction of distortion and rotation that may occur in the virtual image display device 300.

As illustrated in FIG. 13 and FIG. 14, in the present exemplary embodiment, light is guided in the longitudinal direction (Y direction, perpendicular direction), which differs from the light guidance exemplified the first exemplary embodiment, for example, where light is guided in the lateral direction (X direction, horizontal direction). On the other hand, the post-assembly adjustment device AA in the present exemplary embodiment is similar to the first and second correction units COa and COb illustrated in the first exemplary embodiment, for example, (see FIG. 8, for example) and therefore a detailed description is omitted.

As illustrated in FIG. 13, the virtual image display device 300 according to the present exemplary embodiment includes a first display device for a right eye 300A, a second display device for a left eye 300B, and a bridge piece 302 serving as a support member linking the first display device 300A and the second display device 300B in a central area. That is, the bridge piece 302 functions as the assembly member AS that is configured to assemble the optical system constituting the first display device 300A and the optical system constituting the second display device 300B.

Note that the first display device 300A and the second display device 300B have structures that are the same and have left-right symmetry (mirror symmetry) optically, and therefore FIG. 14 depicts only the first display device 300A. Depictions and a description of the second display device 300B will be omitted.

As illustrated in FIG. 14, in the virtual image display device 300 of the present exemplary embodiment, the right-eye first display device 300A includes, as optical elements, a display element 380 and a light-guiding system 390. The light-guiding system 390 guides the imaging light ML from the display element 380 to the formation position of the exit pupil EP.

The display element 380 is similar to the display element 80, for example, in the first exemplary embodiment and the like, and therefore a description of the display element 380 is omitted here. Matters related to shape will be discussed later.

The light-guiding system 390 includes a projection optical system 321, a prism 322, and a see-through mirror 323. The projection optical system 321 condenses the imaging light ML that exits the display element 380 in a nearly parallel beam. In the depicted example, the projection optical system 321 is a single lens and includes an incident surface and an exit surface. The prism 322 includes an incident surface, an inner reflection surface, and an exit surface. The imaging light ML that exits the projection optical system 321 is incident on and refracted by the incident surface of the prism 322, is totally reflected by the inner reflection surface, and exits the prism through the exit surface while being refracted by the exit surface. The imaging light ML that exits the prism 322 is reflected toward the exit pupil EP by the see-through mirror 323. The exit pupil EP is a position where imaging light from various points on the display surface SSa is incident in a prescribed dispersed or parallel state so as to be superimposed in an angle direction that corresponds to the position of each point on the display surface SSa. The light-guiding system 390 in the drawings has a field of view (FOV) of 44°. The display area of the virtual image using the light-guiding system 390 is a rectangle and the above-noted 44° is a diagonal direction.

The projection optical system 321 and the prism 322 are housed in a case 51 together with the display element 380. The case 51 is made of a light shielding material and has a built-in driving circuit (not illustrated) that causes the display element 380 to operate. An opening in the case 51 has a size that does not impede the imaging light ML directed from the prism 322 toward the see-through mirror 323. The opening in the case 51 can be configured to not be a simple opening and instead can be covered by an optically transparent protective cover. The see-through mirror 323 is supported on the case 51 by a support plate 54. The case 51 or the support plate 54 are supported by the bridge piece 302 (see FIG. 13), and an exterior member 303 is configured by the support plate 54 and the see-through mirror 323. Note that an inner lens 331 is disposed on an inner side of the see-through mirror 323.

The light-guiding system 390 is an off-axis optical system. That is, the projection optical system 321, the prism 322, and the see-through mirror 323 constituting the light-guiding system 390 are disposed so as to form an off-axis optical system. Note that the light-guiding system 390 being an off-axis optical system indicates that in the optical elements 321, 322, and 323 constituting the light-guiding system 390, an optical path is bent, overall, before or after a light beam is incident on at least one of a reflection surface and a refraction surface. In addition, the optical axis AX of the light-guiding system 390 discussed above, which is an off-axis optical system, is arranged in a "Z" shape when viewed in lateral cross-section. That is, as illustrated in the drawings, an optical path from the projection optical system 321 to the inner reflection surface, an optical path from the inner reflection surface to the see-through mirror 323, and an optical path from the see-through mirror 323 to the exit pupil EP are arranged to fold back at two stages in a "Z" shape.

Note that in the drawings, an intermediate image MM is formed between the prism 322 and the see-through mirror 323.

The external light HL that passes through the see-through mirror 323 is also incident on the exit pupil EP. In other words, the wearer US wearing the virtual image display device 300 can observe the virtual image formed by the imaging light ML overlaid on the external image.

In particular, in the virtual image display device 300 discussed above, distortion aberration occurs due to the light-guiding system 390 configured by the off-axis optical system. In the present exemplary embodiment, the first and second correction units COa and COb (the post-assembly adjustment devices AA; see FIG. 8, for example) make a correction that likewise takes into consideration even the distortion aberration that occurs in such a light-guiding system 390. Specifically, as illustrated schematically in FIG. 15, a string of processes is carried out in order to make a correction which causes reverse distortion so as to cancel out an aberration (distortion) that occurs. In other words, the first and second correction units COa and COb serving as distortion correction circuits perform distortion correction canceling out distortion generated by the light-guiding system 390. First, in FIG. 15, when an image in the display area IM illustrated in a first state M1 given in a first field 51 is treated as an original image, distortion correction is performed on the image and the display area IM in the display effective area IME enters a second state M2 given in a second field 52. Note that in the second state M2, taking inversion in the optical system and the like into account, up-down and left-right in the image are inverted relative to the original image in the first state M1. From the second state M2, resolution conversion (for example, reduction conversion or the like) is further performed, resulting in a third state M3 given in a third field 63. In addition, rotation correction is performed, resulting in a fourth state M4 given in a fourth field 54, and finally parallel displacement is performed such that the image is in a fifth state M5 indicated by a dashed line in a fifth field 55.

In addition, as a modified example of the above, when performing correction with the right-eye and left-eye distortion correction units DCa and DCb that serve as distortion correction circuits configured to cancel out distortion generated by the light-guiding system 390, correction may be performed to differing extents according to a wavelength region of the imaging light ML exiting the display element 80. In other words, with an image corresponding to the second state M2 illustrated in the second field 62 in FIG. 15, an extent of distortion correction may differ for display areas IMa, IMb, and IMc, which respectively correspond to the wavelength regions for each of red (R), green (G), and blue (B) in the imaging light ML, depending on the wavelength region of each, as illustrated in a sixth state M6 given in a sixth field 66.

As discussed above, in the present exemplary embodiment, after an optical system is assembled with a high degree of accuracy using the bridge piece 302 as the assembly member AS, even when a new shift in the image position between the left and right sides occurs, the shift can be corrected by adjusting the display state of the first display device 300A and the second display device 300B using the post-assembly adjustment device AA.

Modified Examples Etc.

The present disclosure is described according to the above-mentioned exemplary embodiments, but the present disclosure is not limited to the above-mentioned exemplary embodiments. T present disclosure may be carried out in various modes without departing from the gist of the present disclosure, and, for example, the following modifications may be carried out.

Figure 16:
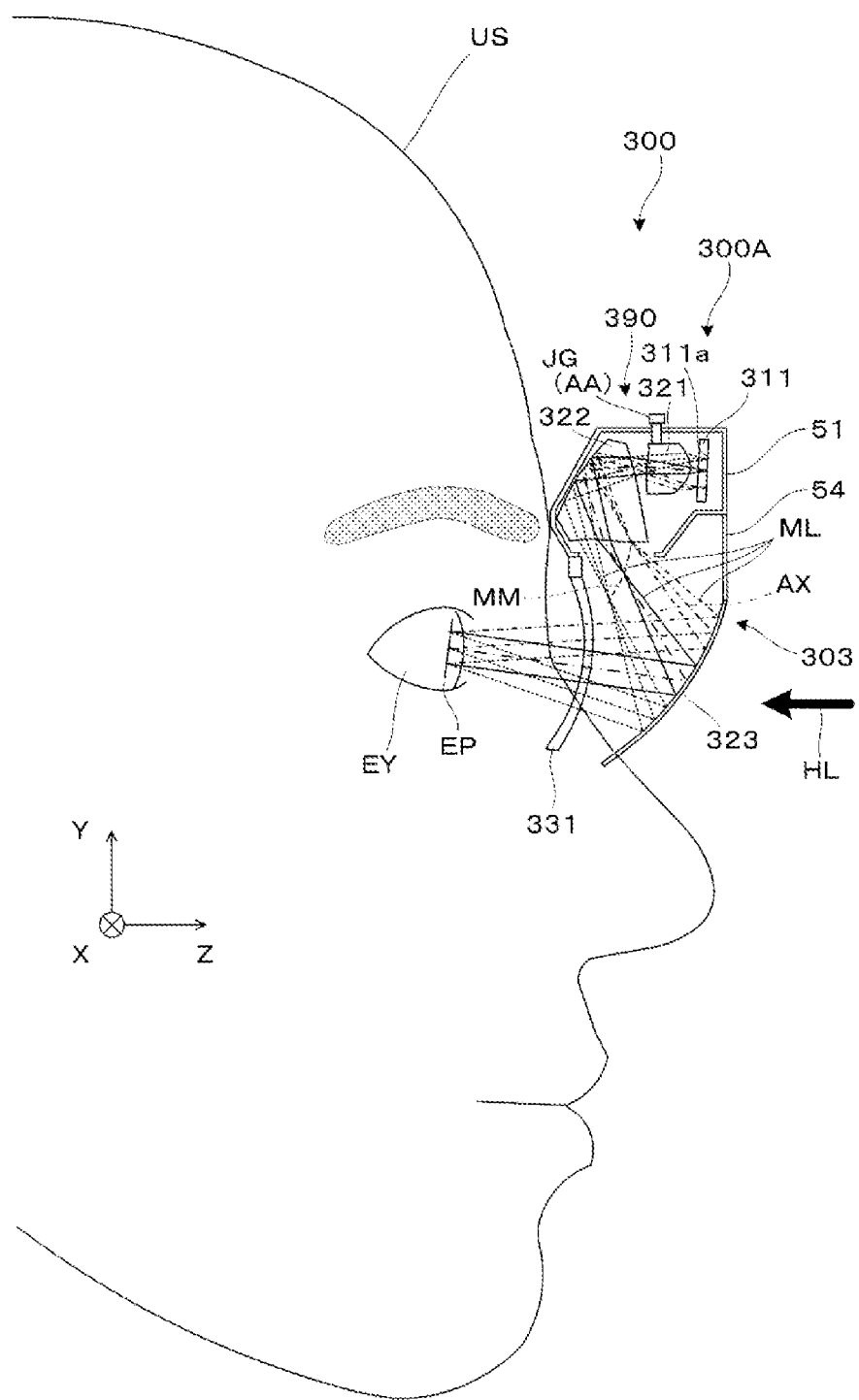
FIG. 16 is an external perspective view illustrating a modified example of the virtual image display device.

The exemplary embodiments above illustrated making adjustments using image processing (electronic processing) performed by the first and second correction units COa and COb as the post-assembly adjustment devices AA configured to adjust the display state after assembly by the assembly member AS. However, the post-assembly adjustment devices AA constituting the virtual image display devices 100, 300, and the like are not limited to the above description, and various modes are conceivable. For example, by providing a mechanism capable of alignment, such as with a jig JG illustrated in FIG. 16, for example, alongside or instead of the first and second correction units COa and COb, a physical mechanism may be used to perform correction that serves as post-assembly adjustment. Note that FIG. 16 corresponds to FIG. 14, and that in the example of FIG. 16, in the state depicted in FIG. 14, the jig JG abuts a side surface of the projection optical system 321 that does not have an optical function, enabling alignment of the projection optical system 321.

Moreover, in the foregoing, various modes can be adopted for the first and second correction amount memories CMa and CMb, the first and second correction circuits CCa and CCb, and the like constituting the first and second correction units COa and COb, for example, serving as the post-assembly adjustment devices AA. For example, in the above-noted example, these components are provided with each divided into left and right sides, but the components may also be stored in a single memory, without splitting the components into left and right sides. In addition, the first and second correction amount memories CMa and CMb, the first and second correction circuits CCa and CCb, and the like may also be configured by a memory, circuit, or the like shared with various other kinds of memory provided in the virtual image display device 100 or the like, for example. Furthermore, in addition to cases where these components are provided inside, for example, each of the display devices 100A and 100B of the virtual image display device 100, a mode is also conceivable in which these components are provided in various locations. For example, a configuration is conceivable in which the components are provided within the control device (controller) CT depicted in FIG. 7 and the like.

In addition, in the foregoing, the lens barrel BR, the case member CS, the frame 102, and the bridge piece 302 were given as examples of the assembly member AS, but various components that enable assembly of the first display device 100A or the like and the second display device 100B or the like can be adopted as the assembly member AS. For example, even when an optical system is configured with a prism and does not have a lens barrel or the like, a fixing member, adhesive material, or the like for positioning the prism may be said to correspond to the assembly member AS. In addition, a joining portion or the like may correspond to the assembly member AS in a situation where a plurality of prisms or the like are joined, for example.

Also, in the foregoing, the adjustment margin MD, for example, is set to ±20 pixels up-down and left-right, but a margin for adjustment is not limited to this and various modes are possible. For example, a margin number, that is, an amount of adjustment possible, may differ between the up-down direction (y direction, perpendicular direction) and the left-right direction (x direction, horizontal direction). For example, when an optical system is formed by an integral member having the see-through-type light-guiding unit 100C depicted in FIG. 1 and the like, or when an optical system is assembled with the bridge piece 302 depicted in FIG. 13, when torsional stress or the like occurs in each step after the optical system is assembled, a shift in the up-down direction (y direction) may be larger than in the left-right direction (x direction). On the other hand, as described with reference to FIG. 6, a shift in the up-down direction (y direction), that is, the longitudinal direction may have a greater impact and there may be more stringent demands for reducing the shift as much as possible. Given this, a mode is conceivable in which, for example, the correction amount for the up-down direction (y direction, perpendicular direction) is configured to be larger than the correction amount for the left-right direction (x direction, horizontal direction).

In addition, a non-rotationally symmetric axis optical system was described in the third exemplary embodiment, but the present disclosure can also be applied to a rotationally symmetric axis optical system of a so-called bird bath type, for example.

Furthermore, a light control device configured to modulate light by limiting transmitted light can be attached to the external side of the first and second virtual image forming optical units 101a and 101b or the see-through mirror 323. The light control device adjusts a transmittance, for example, electrically. Mirror liquid crystals, electronic shades, and the like may be used as the light control device. The light control device may adjust a transmittance according to external light brightness. When the light control device blocks external light, only a virtual image that is not affected by an external image can be observed. Further, the virtual image display apparatus of the claimed disclosure is applicable to a so-called closed-type head-mounted display device (HMD) that blocks external light and causes only imaging light to be visually recognized. In this case, the HMD may also be compatible with a so-called see-through video product constituted by a virtual image display apparatus and an imaging device.

In the description above, the virtual image display devices 100 and 300 are assumed to be worn and used on a head, but the virtual image display devices 100 and 300 described above may also be used as a hand-held display that is not worn on a head and is looked into like a pair of binoculars. In other words, the head-mounted display also includes a hand-held display in the present disclosure.

In addition, in the foregoing, for example, the optical axis (exit optical axis) AX may conceivably be configured to extend at a downward incline of approximately 10° relative to the +Z direction (front direction). By configuring the optical axis AX to decline approximately 10° relative to the Z axis (horizontal axis) on the front side, eye EY fatigue for the wearer US observing the virtual image can be reduced. In such a case, for correction on the panel side, the shape of the display element 80 can be modified as appropriate and as necessary.

The virtual image display device according to a specific mode is provided with a first display device for a right eye, a second display device for a left eye, an assembly member configured to assemble the first display device and the second display device, and a post-assembly adjustment device configured to adjust a display state of the first display device and the second display device assembled by the assembly member.

In the virtual image display device described above, after assembling the first display device and the second display device using the assembly member, even when a new shift in the image position between the left and right sides occurs, the shift can be corrected by adjusting the display state of the first display device and the second display device using the post-assembly adjustment device.

In a specific aspect, when assembling the first display device and the second display device, the assembly member adjusts the relative left-right postures of the display devices. In such a case, the assembly member can adjust relative shift to the left or right and achieve a state with visibility balanced between the left and right sides.

In another aspect, the adjustment amount in assembly using the assembly member is greater than an adjustment amount in readjustment with the post-assembly adjustment device. In such a case, once the assembly device is used to make an adjustment that includes a large shift and a highly accurate adjustment is made, so-called fine-tuning adjustment is performed in the readjustment with the post-assembly adjustment device.

In still another aspect, the first display device and the second display device include a panel-type display element and a light-guiding system configured to guide imaging light that exits the display element, the assembly member performs assembly while making an adjustment of relative positions of the display element and the light-guiding system, and the post-assembly adjustment device adjusts the display area of the display element. In such a case, after the relative position of the light-guiding system with respect to the panel-type display element is adjusted by the assembly member, even when a shift in the position adjustment occurs in another manufacturing process, the shift can be corrected by adjusting the display area of the panel-type display element using the post-assembly adjustment device.

In still another aspect, the display area of the display element is narrower than a display effective area of the display element, the display element includes a margin region such that the display area is variable in the display effective area, and the post-assembly adjustment device includes an image processing circuit configured to convert an input image signal and output the image signal to the display element. This enables image processing that utilizes the margin region formed by the difference between the display effective area and the display area.

In still another aspect, the post-assembly adjustment device includes, as the image processing circuit, an enlargement processing circuit configured to convert the input image signal to an image signal having a greater number of pixels than the input image signal. In such a case, the input image signal can be converted to an image signal adapted to the display effective area of the display element.

In still another aspect, the post-assembly adjustment device may perform one of parallel displacement of a display position and rotation of the display position within a range of a number of pixels of the image signal increased due to conversion by the enlargement processing circuit. In such a case, image loss or the like associated with image processing in the post-assembly adjustment device can be inhibited or avoided, for example.

In still another aspect, the post-assembly adjustment device includes, as the image processing circuit, a reduction processing circuit configured to convert the input image signal to an image signal having a smaller number of pixels than a number of pixels of the display effective area in the display element. In such a case, the margin region for image processing in the post-assembly adjustment device can be ensured.

In still another aspect, the post-assembly adjustment device performs one of parallel displacement of the display position and rotation of the display position within a range of a difference between a number of pixels of the image signal decreased due to conversion by the reduction processing circuit and the number of pixels of the display effective area in the display element. In such a case, image loss or the like associated with image processing in the post-assembly adjustment device can be inhibited or avoided, for example.

In still another aspect, the post-assembly adjustment device performs conversion processing on an image signal branched into two, corresponding to the first display device and the second display device, and the conversion processing differs between the two branched signals. In such a case, conversion processing is performed that is suited to the first display device and the second display device, respectively.

In still another aspect, the image processing circuit includes a distortion correction circuit configured to perform distortion correction canceling out distortion generated by the light-guiding system, and the distortion correction circuit makes corrections to differing extents according to a wavelength region of the imaging light exiting the display element. In such a case, correction adapted to color aberration is also possible.

In still another aspect, the light-guiding system includes a projection optical system configured to converge the imaging light that exits the display element, a prism in which the imaging light that exits the projection optical system is incident on and refracted by an incident surface, the imaging light is totally reflected by an inner reflection surface, and the imaging light exits the prism through an exit surface while being refracted, and a see-through mirror reflecting the imaging light that exits the prism toward a pupil position and transmitting external light. In such a case, further optical performance improvements can be achieved with the see-through mirror, the projection optical system, and the prism, and the device can be miniaturized.

In still another aspect, a Z-shaped optical path is formed by two-stage folding obtained by folding the optical path at the inner reflection surface of the prism and folding the optical path at the see-through mirror. In such a case, by bending the optical path in the "Z" shape, device miniaturization can be achieved.

In still another aspect, the light-guiding system forms an off-axis optical system. In such a case, miniaturization of the optical system and consequently miniaturization of the device overall can be achieved while preserving resolution.

In still another aspect, as a position adjustment for a virtual image that is to be visually recognized, the post-assembly adjustment device makes an adjustment in a second direction that intersects with a first direction in which the first display device and the second display device align. In such a case, the display position of the virtual image can be adjusted in a direction that is longitudinal with respect to the direction in which the first display device and the second display device are aligned, that is, a lateral direction in which the eyes of an observer are aligned.

An optical unit according to a specific mode is provided with a first display device for a right eye, a second display device for a left eye, an assembly member configured to assemble the first display device and the second display device, and a post-assembly adjustment device configured to adjust a display state of the first display device and the second display device assembled by the assembly member.

In the optical unit described above, after assembling the first display device and the second display device using the assembly member, even when a new shift in the image position between the left and right sides occurs, the shift can be corrected by adjusting the display state of the first display device and the second display device using the post-assembly adjustment device.

An adjustment method of a virtual image display device according to a specific mode is an adjustment method of a virtual image display device including a first display device for a right eye and a second display device for a left eye, in which the method includes adjusting a display state of the first display device and the second display device that were assembled while adjusting left-right postures of the display devices.

With the adjustment method described above, after assembling the first display device and the second display device that were assembled while adjusting the left-right postures of the display devices, even when a new shift in the image position between the left and right sides occurs, the shift can be corrected by adjusting the display state of the first display device and the second display device.

A manufacturing method of a virtual image display device according to a specific mode is a manufacturing method of a virtual image display device including a first display device for a right eye and a second display device for a left eye, in which the method assembles the first display device and the second display device while adjusting left-right postures of the first display device and the second display device and adjusts a display state of the assembled first display device and second display device.

With the manufacturing method described above, a virtual image display device can be manufactured in which, after assembling the first display device and the second display device that were assembled while adjusting left-right postures of the first display device and the second display device, even when a new shift in the image position between the left and right sides occurs, the shift can be corrected by adjusting the display state of the first display device and the second display device.

What is claimed is:

1. A virtual image display device comprising:
a first display device that includes a first display element emitting a first imaging light, a first light-guiding system guiding the first imaging light, and a first projection optical system emitting the first imaging light from the first display element to the first light-guiding system, wherein the first display element and the first projection optical system align along a first optical axis of the first projection optical system;
a second display device that includes a second display element emitting a second imaging light, a second light-guiding system guiding the second imaging light, and a second projection optical system emitting the second imaging light from the second display element to the second light-guiding system, wherein the second display element and the second projection optical system align along a second optical axis of the second projection optical system;
a first assembly member that is assembled to the first display device, wherein the first assembly member adjusts a relative position between the first display element and the first projection optical system along the first optical axis;
a second assembly member that is assembled to the second display device, wherein the second assembly member adjusts a relative position between the second display element and the second projection optical system along the second optical axis; and
a post-assembly adjustment device that adjusts a position of a display area in each of the first display element and the second display element based on a difference between a first incident angle of the first imaging light emitted by the first light-guiding system with respect to a position of a first exit pupil and a second incident angle of the second imaging light emitted by the second light-guiding system with respect to a position of a second exit pupil, wherein
the first assembly member comprises a first case member that houses the first display element and a first lens barrel that houses the first projection optical system, and the first case member is configured to move relative to and attach to the first lens barrel, the first lens barrel comprises a first excavated portion, the first case member comprises a first protruding portion configured to insert to the first excavated portion, a first gap is formed between the first excavated portion and the first protruding portion when the first protruding portion is inserted to the first excavated portion, the second assembly member comprises a second case member that houses the second display element and a second lens barrel that houses the second projection optical system, and the second case member is configured to move relative to and attach to the second lens barrel, the second lens barrel comprises a second excavated portion, the second case member comprises a second protruding portion configured to insert to the second excavated portion, and a second gap is formed between the second excavated portion and the second protruding portion when the second protruding portion is inserted to the second excavated portion.

2. The virtual image display device according to claim 1, wherein in a first direction in which the first display device and the second display device align, the first assembly member adjusts postures of the first display device with relative to postures of the second display device adjusted by the second assembly member.

3. The virtual image display device according to claim 2, wherein an adjustment amount of assembly using the first assembly member is greater than an adjustment amount of the post-assembly adjustment device.

4. The virtual image display device according to claim 1, wherein the first assembly member adjusts a first relative positions between the first display element and the first light-guiding system, and the second assembly member adjusts a second relative positions between the second display element and the second light-guiding system.

5. The virtual image display device according to claim 4, wherein the display area of the first display element is narrower than a display effective area of the first display element, the first display element includes a margin region such that the display area is variable in the display effective area, and the post-assembly adjustment device includes an image processing circuit that converts an input image signal to a first image signal and that outputs the first image signal to the first display element.

6. The virtual image display device according to claim 5, wherein the image processing circuit is an enlargement processing circuit that converts the input image signal to the first image signal that is greater a number of pixels than a number of the input image signal.

7. The virtual image display device according to claim 6, wherein the post-assembly adjustment device performs one of parallel displacement of a display position and rotation of the display position within a range of the number of pixels of the first image signal increased due to conversion by the enlargement processing circuit.

8. The virtual image display device according to claim 5, wherein the image processing circuit is a reduction processing circuit that converts the input image signal to a second image signal that is smaller a number of pixels than a number of pixels of the display effective area in the first display element.

9. The virtual image display device according to claim 8, wherein the post-assembly adjustment device performs one of parallel displacement of a display position and rotation of the display position within a range of a difference between the number of pixels of the first image signal decreased due to conversion by the reduction processing circuit and the number of pixels of the display effective area in the first display element.

10. The virtual image display device according to claim 5, wherein the post-assembly adjustment device performs conversion processing on the first image signal branched into two, corresponding to the first display device and the second display device, and the conversion processing differs between the two branched signals.

11. The virtual image display device according to claim 5, wherein the image processing circuit includes a distortion correction circuit configured to perform distortion correction canceling out distortion generated by the first light-guiding system and the distortion correction circuit makes corrections to differing extents according to a wavelength region of the first imaging light exiting the first display element.

12. The virtual image display device according to claim 4, wherein the first light-guiding system includes:

a projection optical system that converges the first imaging light from the first display element;

a prism that includes an incident surface in which the first imaging light is incident, an exit surface that emits the first imaging light, and a reflection surface that reflects the first imaging light from the incident surface toward the exit surface; and a mirror that reflects a part of the first imaging light from the prism toward a pupil position and that transmits another part of the first imaging light.

13. The virtual image display device according to claim 12, wherein a Z-shaped optical path is formed by two-stage folding obtained by folding an optical path at the reflection surface of the prism and folding the optical path at the mirror.

14. The virtual image display device according to claim 12, wherein the first light-guiding system forms an off-axis optical system.

15. The virtual image display device according to claim 1, wherein as a position adjustment for a virtual image to be visually recognized, the post-assembly adjustment device makes an adjustment in a second direction that intersects with a first direction in which the first display device and the second display device align.

16. An optical unit comprising:

a first display device that includes a first display element emitting a first imaging light, a first light-guiding system guiding the first imaging light, and a first projection optical system emitting the first imaging light from the first display element to the first light-guiding system, wherein the first display element and the first projection optical system align along a first optical axis of the first projection optical system;
a second display device that includes a second display element emitting a second imaging light, a second light-guiding system guiding the second imaging light, and a second projection optical system emitting the second imaging light from the second display element to the second light-guiding system, wherein the second display element and the second projection optical system align along a second optical axis of the second projection optical system;
a first assembly member that assembles the first display device, wherein the first assembly member adjusts a relative position between the first display element and the first projection optical system along the first optical axis;
a second assembly member that assembles the second display device, wherein the second assembly member adjusts a relative position between the second display element and the second projection optical system along the second optical axis; and
a post-assembly adjustment device that adjusts a position of a display area in each of the first display device and the second display device based on a difference between a first incident angle of the first imaging light emitted by the first light-guiding system with respect to a position of a first exit pupil and a second incident angle of the second imaging light emitted by the second light-guiding system with respect to a position of a second exit pupil, wherein the first assembly member comprises a first case member that houses the first display element and a first lens barrel that houses the first projection optical system, and the first case member is configured to move relative to and attach to the first lens barrel, the first lens barrel comprises a first excavated portion, the first case member comprises a first protruding portion configured to insert to the first excavated portion, a first gap is formed between the first excavated portion and the first protruding portion when the first protruding portion is inserted to the first excavated portion, the second assembly member comprises a second case member that houses the second display element and a second lens barrel that houses the second projection optical system, and the second case member is configured to move relative to and attach to the second lens barrel, the second lens barrel comprises a second excavated portion, the second case member comprises a second protruding portion configured to insert to the second excavated portion, and a second gap is formed between the second excavated portion and the second protruding portion when the second protruding portion is inserted to the second excavated portion.

* * * * *